United States Patent [19]

McClanahan

[11] Patent Number: 4,613,952
[45] Date of Patent: Sep. 23, 1986

[54] SIMULATOR FOR AN INDUSTRIAL PLANT

[75] Inventor: Richard C. McClanahan, Carrollton, Tex.

[73] Assignee: Foster Wheeler Energy Corporation, Livingston, N.J.

[21] Appl. No.: 512,809

[22] Filed: Jul. 11, 1983

[51] Int. Cl.⁴ .................... G09B 9/00; G05B 23/02
[52] U.S. Cl. ............................... 364/578; 434/118; 434/219; 434/366
[58] Field of Search ............... 364/578, 801, 802, 900; 434/118, 218, 219, 224, 366

[56] References Cited

U.S. PATENT DOCUMENTS

| 3,146,533 | 9/1964 | Carmody et al. | 434/366 |
| 3,237,318 | 3/1966 | Schager | 434/219 |
| 3,451,147 | 6/1969 | Mehlig et al. | 434/366 |
| 3,914,794 | 10/1975 | Czerniejewski | 434/218 |
| 3,936,885 | 2/1976 | Mutafelija | 434/218 |
| 3,975,622 | 8/1976 | Horn et al. | 364/900 |
| 4,042,813 | 8/1977 | Johnson | 364/578 |
| 4,167,821 | 9/1979 | Gibson, Jr. et al. | 364/578 X |
| 4,293,916 | 10/1981 | del Re et al. | 364/578 X |
| 4,385,349 | 5/1983 | Ashford et al. | 364/578 X |
| 4,464,120 | 8/1984 | Jensen | 364/801 X |

FOREIGN PATENT DOCUMENTS 58-144911 8/1983 Japan ................................... 364/578

OTHER PUBLICATIONS

Randen et al.: Full-Scale Nuclear Power Plant Training Simulator B1, ASEA Journal, vol. 51, No. 5, 1978 pp. 122-126.

Linebarger: Digital Simulation Techniques for Direct Digital Control Studies.
Instrument Society of America, Preprint No. 5. 4-3-64 Conference 1964.

Primary Examiner—Felix D. Gruber
Attorney, Agent, or Firm—Marvin A. Naigur; John E. Wilson; Thomas L. Adams

[57] ABSTRACT

A simulator can simulate a multi-stage industrial plant that is controllable by a digital control and digital programmer for affecting plant operation. The simulator has a plurality of indicators mounted on a console for producing indications in response to display signals applied to the indicators. Also, a plurality of manually operated controls are mounted on the console for allowing production of manual signals. The simulator also has a computer coupled to the indicators for providing to them their display signals. The computer is also coupled to the manually operable controls for receiving their manual signals. The computer can respond to the manual signals of predetermined ones of the manually operable controls to provide a programmed array of processed values sized to simulate parameters existing during operation of the industrial plant. Given ones of this array of values are applied to specified ones of the indicators for providing their indication. The computer can also respond to programmed ones of the array of values for modifying the array to an extent and in a manner determined by the programming. Also employed is a digital programming panel constructed the same as the plant's digital programmer, for affecting the programming and altering the simulator operation.

34 Claims, 28 Drawing Figures

SIMULATOR FOR AN INDUSTRIAL PLANT

BACKGROUND OF THE INVENTION

The present invention relates to simulators for industrial plants and, in particular, to a console and data processing equipment arranged to simulate more than one industrial plant.

Modern industrial plants have evolved to the point where their complexity requires an operator having a high degree of skill. It is not practical to train such an operator at an actual plant since the processes involved are normally kept running continuously and are not conveniently stopped and restarted for training purposes. Furthermore, it is unacceptable to allow a plant to reach an unsafe condition merely to test an operator's proficiency.

Accordingly, many industries especially in the utility/power industry, have resorted to simulators which incorporate a console having many of the control switches and operating instruments found in an actual control room and arranged to duplicate the actual appearance of a control panel. By various electronic means these known simulators respond to operator control signals to display various operating parameters. In some simulators, an instructor has the ability to induce an electronically simulated failure within the plant. This induced failure tests the ability of the student to quickly analyze and properly respond to a plant fault.

A disadvantage with existing simulators is their dedication to a particular plant. Known simulator consoles have been so closely designed to match a particular plant that they are not useful for training for another plant.

For example, a utility may employ various combinations of boilers, air heaters and pulverizers at various sites. One utility may use a known trisector air heater at one site and employ a primary-secondary air heater at another site. Similarly, utilities may fire a boiler with coal which can be pulverized either by a known roller-type mill or a ball mill. Also, the variations in boilers employed at various utility sites can be numerous and some utilities may use both natural circulation and once-through type boilers.

Another disadvantage with known simulators is that they do not take advantage of already existing and designed equipment used to actually control an industrial plant. For example, equipment exists to control in an analog and in a digital fashion various controllable devices of an industrial plant. It would be advantageous to incorporate portions of such existing equipment into a simulator rather than designing new equipment to simulate the operation caused by these pre-existing controls.

Another disadvantage of existing simulators in their attempt to duplicate identically a control room, is the extensive space required for such simulation. Often these simulators include racks of duplicate instruments used to monitor multiple stages that operate in parallel in an industrial plant.

Accordingly there is a need for an improved simulator which is compact and sufficiently flexible to allow simulation of different industrial plants. Furthermore, such improved simulators ought to employ existing equipment actually used in an industrial plant to allow accurate simulation and a reduction in engineering time.

SUMMARY OF THE INVENTION

In accordance with the illustrative embodiment demonstrating features and advantages of the present invention, there is provided a simulator for simulating a multi-stage industrial plant controllable by a digital control and digital programmer for affecting plant operation. The simulator includes a simulator console on which is mounted a plurality of indicators for producing an indication in response to display signals applied thereto. The simulator has a plurality of manually operable controls mounted on the console for producing manual signals. The simulator has a programmable means coupled to the indicators for providing to them the display signals. This processing means is coupled to the manually operable controls for receiving their manual signals. The programmable means includes a modeling means responsive to the manual signals of predetermined ones of the manually operable controls for providing a programmed array of processed values sized to simulate parameters existing during operation of the industrial plant. Given ones of the array of values are applied to specified ones of the indicators for providing the indication. The programmable means also has a control means responsive to programmed ones of the array of values for modifying this array to an extent and in a manner determined by programming of the programmable means. Also employed is a digital programming panel constructed the same as the plant's digital programmer, for affecting the programming and altering the operation of the control means.

Also in accordance with the principles of the same invention, a simulator for simulating a multi-stage plant having at least one stage with a plurality of similar substages includes the foregoing simulation console, plurality of indicators, plurality of manually operable controls and programable means. In this simulator the manually operable controls include at least one selector associated with a corresponding group of indicators. This group of indicators is driven by the programmable means to display operating parameters of a selected one of the plurality of similar substages. Selection of one of the similar substages for the group is controlled by the selector.

Also in accordance with the principles of the same invention the simulator for simulating a multi-stage industrial plant having a plurality of controllable devices includes the foregoing simulation console, plurality of indicators, plurality of manually operable controls and programmable means. The simulator also includes a main terminal coupled to the programable means for displaying its messages and for giving it one of a plurality of program-affecting instructions. Also included is a remote, portable terminal coupled to the programmable means for displaying its messages and for giving it one of a plurality of program-affecting instructions. This portable terminal can be operated to alter the array of values to simulate a faulty condition.

Also in accordance with the principles of the same invention, a simulator for simulating a multi-stage industrial plant having a digital control and digital programmer for affecting plant operation, includes the foregoing simulation console, plurality of indicators, plurality of manually operable controls and programmable means. This simulator also includes a schematic panel detachably secured to the console at a position to allow removal without interfering with the indicators and the manually operable controls. This schematic panel illustrates the industrial plant.

Also in accordance with the same invention there is provided a method for alternatively simulating any one of a plurality of industrial plants with a plurality of console-mounted, replaceable indicators and manual controls detachably connected to a computer. The method includes the step of replacing corresponding ones of the indicators and manual controls to allow simulation of a selected one of the industrial plants. Another step of the method is installing in the simulator a digital programmer constructed as the one in the plant and changing the computer programming by operating the digital programmer of the simulator. Another step in the method is reprogramming the computer to provide for the selected one of the plants, a mathmatical model responsive to the manual controls for producing at least one simulated operating parameter, for display by the indicators.

By employing apparatus and methods of the foregoing type an improved plant simulator is provided. In a preferred embodiment, the simulator is in the form of a compact console having a schematic panel attached atop the console. The panel, the indicators and the controls mounted on the console can be replaced. Thus, when training for a new or modified plant is necessary, the instrumentation and controls as well as the schematic panel is replaced. Thus the effect on the hardware is not burdensome. The new simulation is effected then by reprogramming a computer associated with the simulator. Therefore a complete recasting of the manner of operation of the simulator can be performed with relatively little hardware changes.

This preferred simulator employs a hand held module which an instructor uses to key in certain instructions. For example, the instructor can require the computer to simulate a predetermined fault such as the failure of a valve to be in the proper position.

Also this preferred embodiment employs a digital programmer normally used in an industrial plant to specify certain permissives which must be satisfied for continuing plant operation. This programmer can then be employed by the instructor to allow digital programming and thus simulation of a particular industrial plant.

In one preferred embodiment the simulator simulates a utility plant employing a coal pulverizer, boiler and turbine-driven generator. This preferred embodiment is arranged to simulate eight variations of such a utiltiy plant. The plant simulated can employ either a natural circulation or once-through boiler. Another variation is the use of roller-type or ball mill pulverizers. Still another combination is the use of either trisector or primary-secondary air heaters.

In this preferred embodiment, the compactness of the simulator is enhanced by avoiding duplication of instruments which monitor multiple stages of equipment operating in parallel. For example, some plants may employ four pulverizer mills. Rather than incorporating four racks of instruments for controlling and indicating the status of each mill, a single panel is used. This panel, however, employs a selector switch to instruct the computer to display parameters associated with the selected mill.

BRIEF DESCRIPTION OF THE DRAWING

The above brief description as well as other features and advantages of the present invention will be more fully appreciated by reference to the following detailed description of a presently preferred but nonetheless illustrative embodiment in accordance with the present invention when taken in conjunction with the accompanying drawings, wherein.

DETAILED DESCRIPTION OF THE PREFERRED EMBODIMENT

Figure 1:
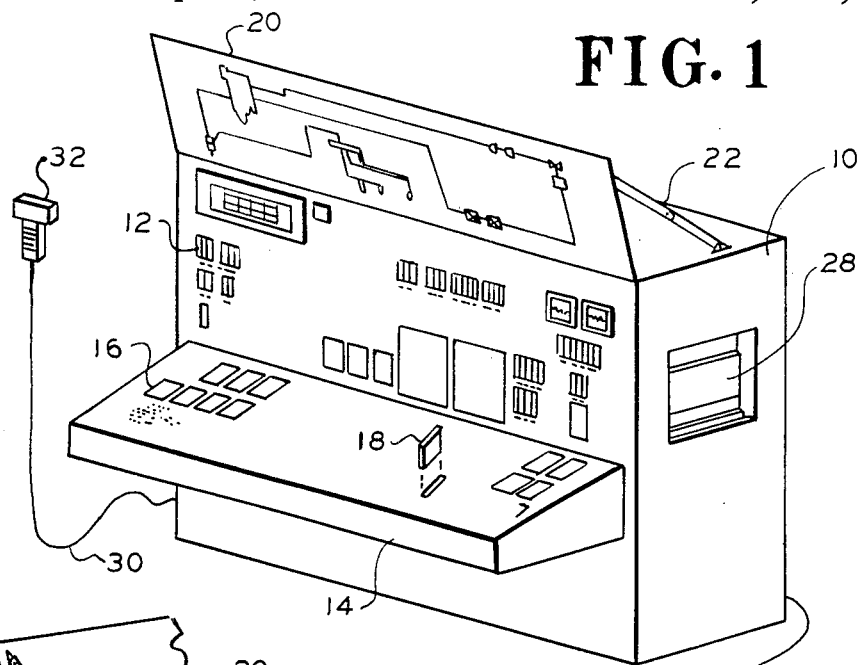
FIG. 1 is a perspicitive view of a simulator according to the principles of the present invention.

Referring to FIG. 1, a simulator is shown herein as a console in the form of a rectangular cabinet 10 having on its forward vertical face a plurality of indicators and controls such as group 12. The console also has a table top console 14 on which are also mounted a plurality of indicators and controls such as group 16. These indicator and controls are replaceable as suggested by element 18 which can be added to the console to either provide an additional indication or control or to replace another indicator or control. As described herein in further detail, such replacement or addition of indicators and/or controls allows the basic console to be reconfigured to simulate any one of a plurality of industrial plants. In a preferred embodiment, the end dimensions of cabinet 10 are sized to allow it to pass through a standard door, although obviously other dimensions may be employed instead. For this reason, table-type console 14 is hinged to allow it to swing downwardly and fit into a recess (not shown) in cabinet 10.

Also shown herein is a schematic panel 20 in the form of a steel plate detachably hinged to the front upper corner of cabinet 10. Panel 20, positioned to tilt forwardly to improve visibility, is held in position by a pair of supporting struts, strut 22 being visible in this view. By removing appropriate hinge pins and strut pins (not shown) schematic panel 20 can be replaced.

As described herein in further detail, panel 20 schematically illustrates an industrial plant such as a utility plant employing a coal fired boiler powering a turbine/generator combination. In this preferred embodiment, one of eight panels can be installed atop cabinet 10. The 5 panels allow three alternatives (eight combinations). The preferred alternatives are a choice between primary-secondary airheaters or trisector airheaters. Another alternative is a choice between a natural circulation or a once-through boiler. A third alternative is the use of a ball mill or roller-type pulverizer. Obviously, however, the simulation decribed herein can be applied to other types of facilities including nuclear power plants, chemical processing plants, petroleum cracking plants, and any other complicated industrial plant requiring careful training of an operator.

Connecting to cable 24 is a main terminal 26 having a conventional keyboard and printer for allowing communication between the terminal and a computer. Mounted in the right side of cabinet 10 is a programmable means, minicomputer 28. Although other types and sizes of computers can be employed, the preferred embodiment employed a Nova 4X minicomputer complete with a 128KB memory and a cassette input/output. This Nova TM computer also cooperates with a Quantex TM -type controller.

Also, connecting to computer 28 through cable 30 is a hand-held instructor's module 32, described herein in further detail. This hand-held, portable terminal can be employed by an instructor to instruct computer 28 to display a fault condition requiring a quick corrective response by a student.

Figure 2:
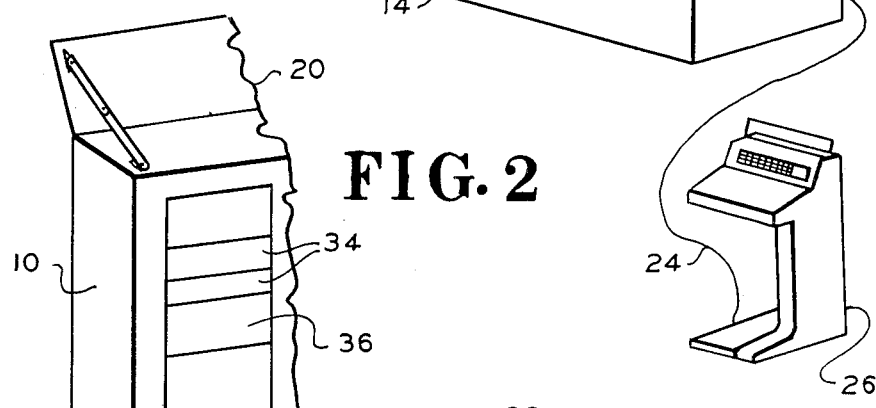
FIG. 2 is rear perspective view of a portion of the simulator console of FIG. 1.

Referring to FIG. 2, there is shown mounted at the rear of cabinet 10 a pair of panels 34 which are part of the previously described computer 28. These panels are the tape drive and control panel associated with computer 28 and used for storing and loading programming information. As described hereinafter, the cassette can contain programming instructions to establish simulation parameters for a particular type of industrial plant. Furthermore, the cassette can be used to store certain initial operating conditions. Storage of such operating conditions may be useful when a student should commence his day of instruction with a plant simulating a predetermined condition, either because of its importance or because these were the conditions existing at the end of his last class.

Panel 36 illustrates a digital programming means such as a CQIII-type digital programmer manufactured by Forney Engineering Company of Addison, Tex. This panel, described herein in further detail, is also described with its associated equipment in U.S. Pat. No. 3,975,622, entitled Programmable Logic Controller System. Lower panel 38 may contain power supplies and other electronic equipment described hereinafter. It is anticipated that the bulk of the multiplexing, transmitting and receiving apparatus necessary to allow communication between computer 28 (FIG. 1) and the indicators and controls 12 and 16 on the consoles 10 and 14, will be located within cabinet 10 and will be accessible through rear doors (not shown).

Figure 3:
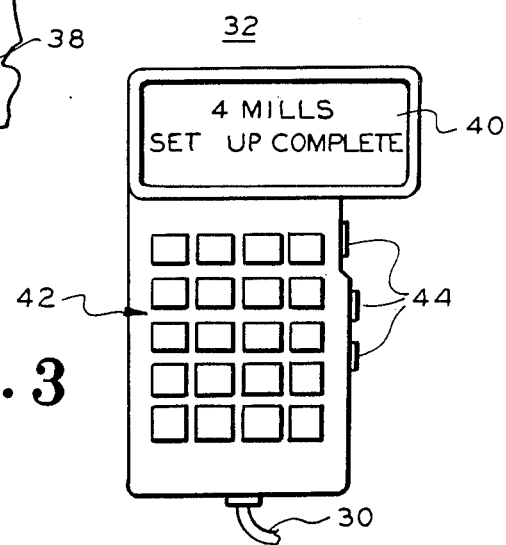
FIG. 3 is a front view of the hand-held, portable terminal of FIG. 1.

Referring to FIG. 3, previously illustrated instructor's module 32 is shown including a keyboard 42 having an array of twenty front keys together with three side, select keys 44. The front keys 42 are engraved with the designations listed in the following Key table:

KEY TABLE

| Row No. | Column | | | |
|---|---|---|---|---|
| | 1(left) | 2 | 3 | (right)4 |
| (top) 1 | CLR | "@" | ABC | DEF |
| | | 1 | 2 | 3 |
| 2 | SET UP | GHI 4 | JKL 5 | MNO 6 |
| 3 | ADS | PRS 7 | TUV 8 | WXY 9 |
| 4 | HIST CALL | HIST STR | Z$Q 0 | HOLD |
| 5 (bottom) | (blank) | FAULT | CLR FAULT | EXEC |

Each of the keys are thus marked with the characters each can transmit. For example, the key labeled JKL5, when solely depressed, issues character 5. However, if one of the three side keys 44 are simultaneously depressed the character becomes either a J, K or L. Module 32 also employs the usual execute and clear buttons. It also has keys for commanding either storing or recalling of conditions which are or will be displayed on the console. Module 32 also has an alpha-numeric display 40 comprising an LED or other suitable display device. Module 32 can be constructed in the usual fashion in which terminals are constructed or can be purchased (Termiflex TM type HT/12 Portable terminal).

Figure 4:
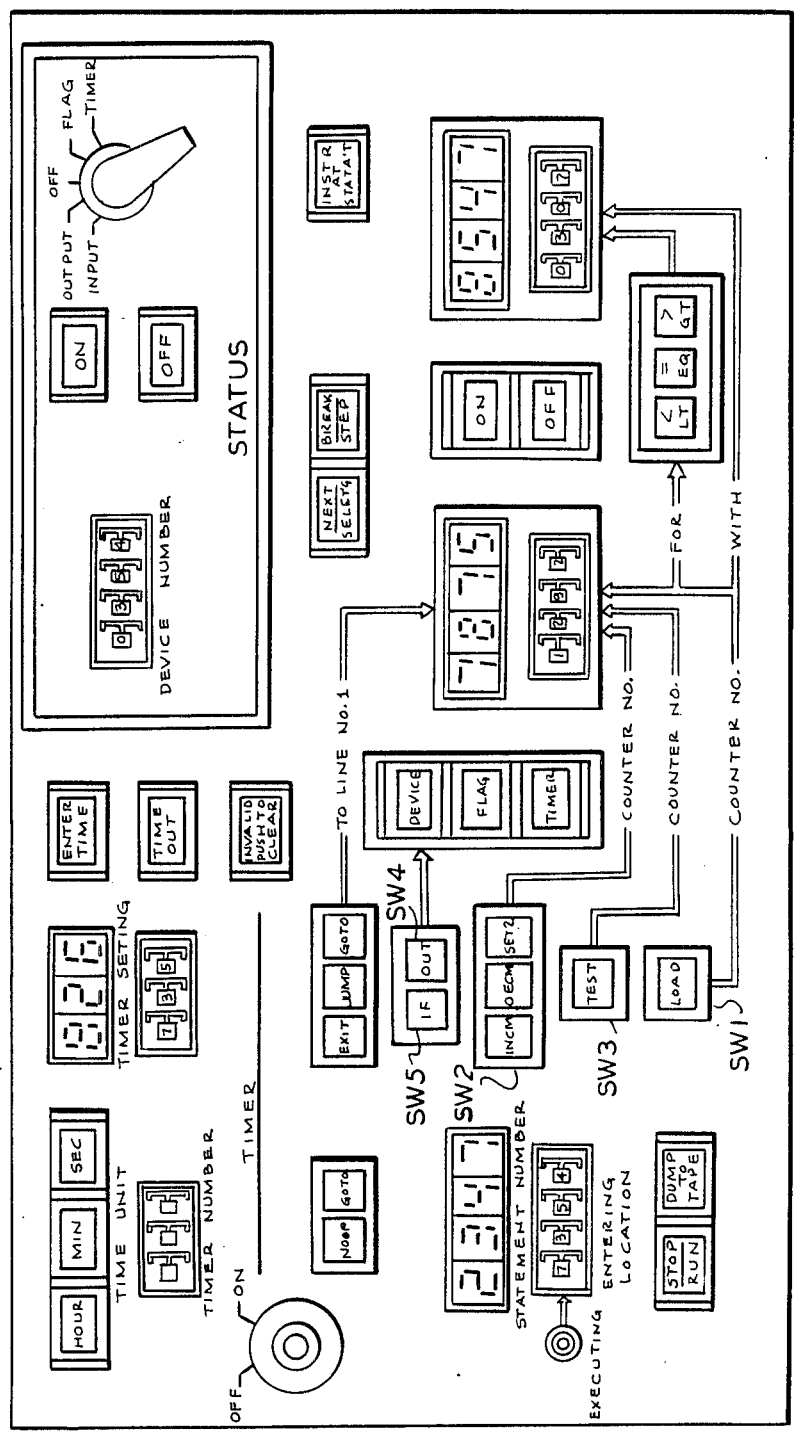
FIGS. 4A and 4B, collectively referred to as FIG. 4, is a front view of a logic programming panel known to the prior art.
Figure 4A:
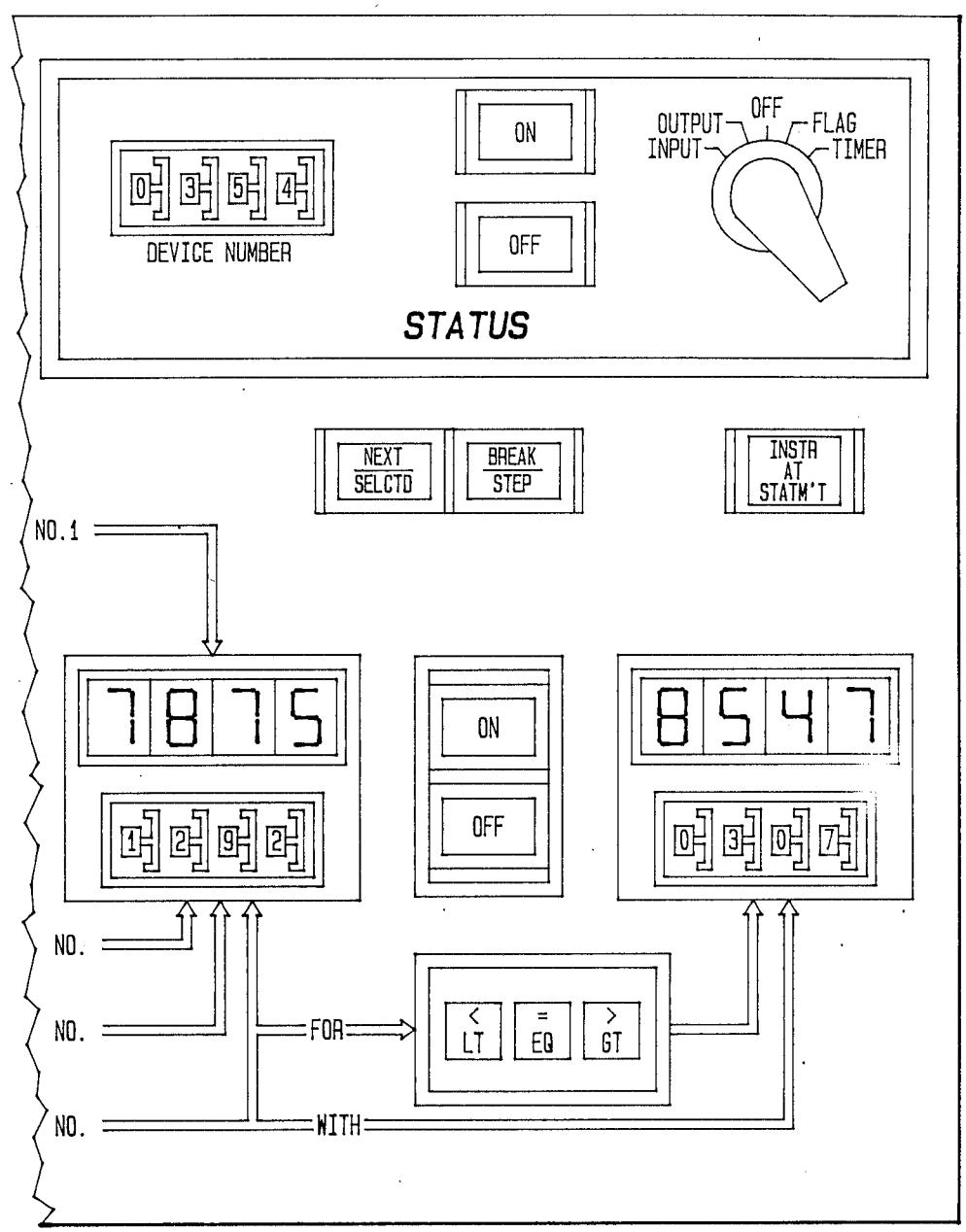
Figure 4B:
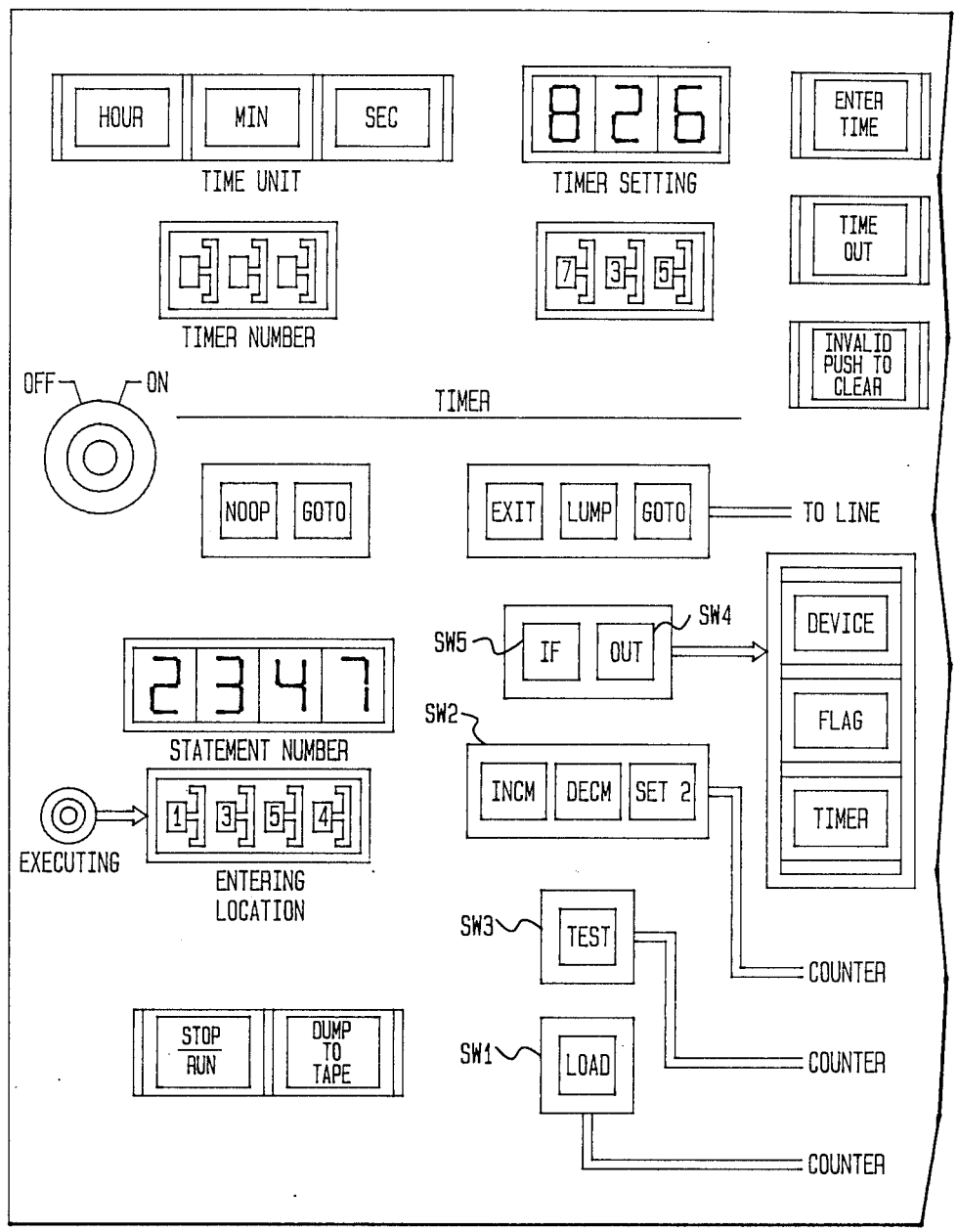

Referring to FIG. 4, previously identified panel 36 is illustrated in detail. Since the apparatus illustrated in FIG. 4 is described in detail in U.S. Pat. No. 3,975,622, such description will not be repeated herein but will be incorporated by reference. Generally, however, panel 36 is an array of manual switches which are used to write and read individual programming instructions. These programming instructions are of the "digital" type. By "digital" is meant that the decisions and outputs made by these programming steps are binary. As described in further detail in the above noted U. S. Patent, programming steps issued by first switch means SW1 can instruct an associated computer to set a programmed counter at a predetermined count and to change its value through second switch means SW2. Also by using third switch means SW3, this counter can be compared against a programmed value. Similarly, fourth and fifth switch means SW4 and SW5 can be used to start and test, respectively, various timers, which may be internally created by the computer.

It is important to note that programming panel 36 of FIG. 4 is a piece of hardware actually used at a plant site in conjunction with other equipment to operate an actual plant. Thus it is important to realize that significant portions of the equipment described herein need not be specifically designed for the simulator but may be simply incorporated into it.

Figure 5:
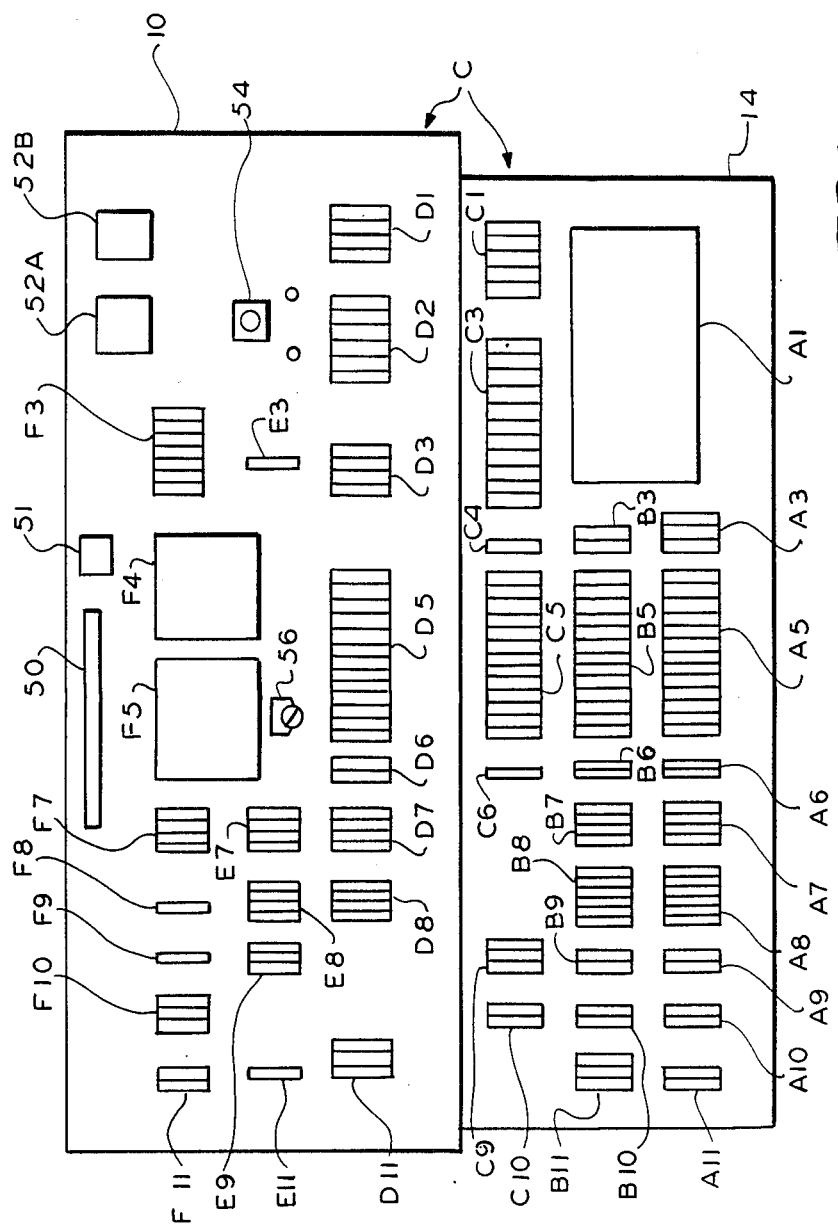
FIG. 5 is a development of the upright and table-type consoles illustrated in FIG. 1.
Figure 6:
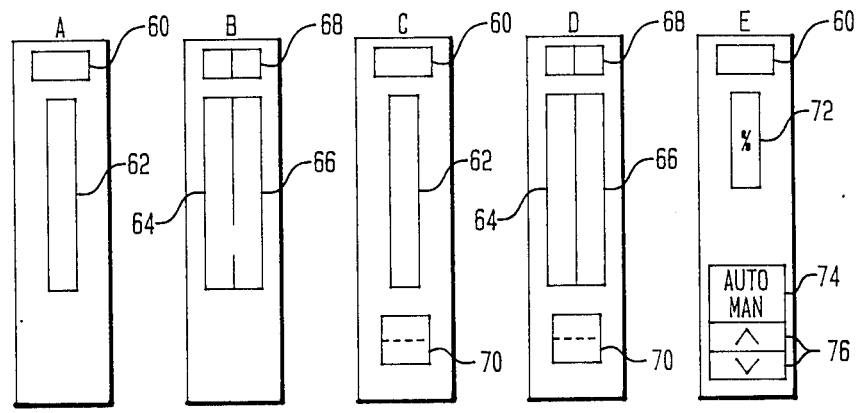
FIGS. 6A through 6I are plan views of typical instruments used in the console of FIG. 5.
Figure 6:
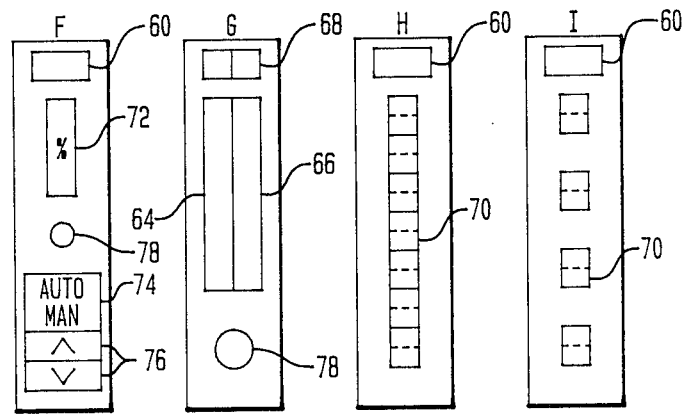

Referring to FIG. 5, a development is given of the consoles 10 and 14 (collectively referred to as console C) showing a typical layout of the indicators and controls. Most of the positions are illustrated as groups of narrow insert panels designated by a reference character having a alphabetic prefix and a numeric suffix. The alphabetic prefix refers to the row in which the group is located. The various types of instruments contained in the groups of FIG. 5 are illustrated in FIG. 6 and tabulated in Table I. In this Table certain of the elements listed may be replicated so that two or more may exist to service a plurality of similar, simulated, plant stages.

Referring to FIG. 6, nine typical types of indicators and controls are illustrated, although other types are possible. It is preferred, however, that the outline of each indicator/control have the same dimensions so that they can be interchanged in the manner previously described. In FIG. 6A a single instrument is illustrated with a label 60 having an appropriate legend such as "drum pressure." The various titles on the labels may be adopted from Table I. Meter 62 is illustrated herein as an edge-type whose pointer moves tangentially in the plane of the viewer. The face of meter 66 can be marked with appropriate designations such as "0", "100 PSI", etc. This type of meter is listed in Table I as type M.

The insert panel of FIG. 6B shows a pair of side by side instruments 64 and 66, each constructed similarly to previously illustrated meter 62. Meters 64 and 66 have associated with them a segmented label 68 designating the significance of each meter. Meters 64 and 66 can be closely associated display parameters. For example, the left meter 64 may display a demand by an operator for a turbine to produce a certain amount of power. The associated meter 66 can display the actual power output produced by the generator.

The panel insert of FIG. 6C is identical to that of FIG. 6A except for the inclusion of alternate action switch 70 (type S component in Table I). Switch 70 employs an upper and lower illuminated portion. Each depression of switch 70 alternately causes either the upper or the lower portion of the switch face to illuminate while the other portion extinguishes. Switch 70 may be used, for example, to close or open a valve. The arrangement of FIG. 6C could be used to operate through switch 70 a valve that allows filling of a tank. The level liquid in the tank could be illustrated by meter 62 of FIG. 6C.

The insert panel of FIG. 6D is identical to that of FIG. 6B except for the inclusion of a pair of meters 64, 66, identical to that previously illustrated in FIG. 6B. The panel insert of FIG. 6D may be used to illustrate two closely related parameters. For example, the pH level and conductivity of a liquid in a tank can be illustrated by meters 64 and 66. Switch 70 of FIG. 6D can be operated to open a valve to admit conditioning chemicals into that tank to change the pH level of that liquid.

The panel insert of FIG. 6E has a meter 72 similar to but smaller than meter 62 of FIG. 6A. Meter 72 is conveniently labeled in percentage, 0 to 100%. Meter 72 is typically used to display a demand or control value. In Table I a demand meter is identified as type C. For example, meter 72 could illustrate the demanded percentage of opening of a valve. There would usually be associated with meter 72 another meter showing the response. For example, the flow rate resulting from the percentage of opening of valve. Under meter 72 is an auto/manual alternate action switch 74 similar in construction to previously illustrated switch 70 (FIG. 6C). This switch, identified as type A in Table I, is associated with the control meter 72 and selects either an automatic or manual adjustment of the demand parameter displayed by meter 72. For example, by depressing switch 74 the upper portion of the switch face, marked "AUTO", will illuminate. The previously mentioned computer will regulate the percentage of opening of a valve, for example, as displayed by meter 72, to create a desired flow rate, liquid level, temperature, etc. In the event that switch 74 is operated to select a manual mode of operation, the pair of push button switches 76 (type U in Table I) are rendered effective and their signals will control the previously mentioned computer. Switches 76 are individually labeled with an upwardly and downwardly pointing arrowhead to indicate that the controlled element associated with the meter 72 should be increased or decreased, respectively. This panel of FIG. 6E may be often associated with another panel such as that of FIG. 6B. The panel of FIG. 6B can be used to illustrate the comparison between a "measured" parameter (actually computer simulated) and a desired set point. The set point can be determined by the computer when it is in the automatic mode.

The panel of FIG. 6F is identical to that of FIG. 6E except for the inclusion of a set point adjusting potentiometer 78 (type K in Table I). In the manual mode potentiometer knob 78 has no effect. For example, knob 78 can be used to adjust a set point meter such as the one shown in FIG. 6B when in an automatic mode. The set point can be a liquid level in a tank, for example. In the event knob 78 is used to adjust a set point it will typically be marked with the legend "SP".

In some panels, knob 78 will be interpretted by the computer in a different fashion as establishing a bias from an automatically controlled value. In this event, knob 78 will be marked "B" and is identified as type B in Table I. For example, meter 72 may represent the fuel being demanded from a pulverizing mill by the computer to satisfy the need for a specific power output from a turbine-driven generator. Because of the effect of this demanded feed rate on various other operating parameters, the operator may wish to offset the demand value. In this case, knob 78 can be used in the automatic mode to adjust the controlled element indicated by meter 72.

FIG. 6G shows a panel similar to that of FIG. 6B except for the inclusion of previously mentioned adjustment knob 78. In one case knob 78 can be used to manually set a set point which may be indicated by left meter 64, while right meter 66 shows the actual response. Alternatively, knob 78 can be used as a bias adjustment to indicate that it offsets an automatically controlled parameter in a manner similar to that previously described.

The panels of FIGS. 6H and 6I have a plurality of alternate action switches 70 which can be arranged in clusters or separated as shown in these two examples. These switches may be arranged to control associated valves, dampers, or other controllable device.

TABLE I

| CONSOLE INSTRUMENT OR CONTROL | POSITION | TYPE |
|---|---|---|
| condensate storage level | F11 | M |
| condenser make up flow | F11 | M |
| start/stop makeup | F11 | S |
| hotwell temp. | F10 | M |
| l.p. heater outlet temp. | F10 | M |
| d.a. outlet temp. | F10 | M |
| h.p. to heater 2 outlet temp. | F10 | M |
| economizer inlet temp. | F10 | M |
| b.f.p. discharge press | F9 | M |
| secondary air flow | F7 | M |
| windbox/furnace dp | F7 | M |
| furnace pressure narrow | F7 | M |
| furnace pressure wide | F7 | M |
| drum pressure | F3 | M |
| finishing s.h. outlet press | F3 | M |
| throttle pressure | F3 | M |
| first stage shell pressure | F3 | M |
| reheater inlet pressure | F3 | M |
| reheater outlet pressure | F3 | M |
| condensate pump discharge press. | E11 | M |
| condensate pump discharge flow | E11 | M |
| b.f.p. barrel temp. | E9 | M |
| b.f.p. pressure | E9 | M |

TABLE I-continued

| CONSOLE INSTRUMENT OR CONTROL | POSITION | TYPE |
|---|---|---|
| b.f.p. flow | E9 | M |
| b.f.p. speed | E9 | M |
| airheaters, s.a., inlet temp. | E8, D8 | M |
| airheaters, s.a., outlet temp. | E8, D8 | M |
| airheater gas inlet temp. | E8, D8 | M |
| airheater gas outlet temp. | E8, D8 | M |
| airheaters, p.a., inlet temp. | E8, D8 | M |
| airheaters, p.a., outlet temp. | E8, D8 | M |
| f.d. fan amps | E7, D7 | M |
| f.d. fan discharge pressure | E7, D7 | M |
| i.d. fan amps | E7, D7 | M |
| i.d. fan suction pressure | E7, D7 | M |
| igniter fuel flow | E3 | M |
| stop/run igniter fuel oil pump | E3 | S |
| condensate polisher dP | E11 | M |
| condenser pH | E11 | M |
| condenser mhos | E11 | M |
| close/open chemical feed valve | E11 | S |
| silica | E11 | M |
| primary air fan A amps | D6 | M |
| primary air fan B amps | D6 | M |
| mill amps | X5 | M |
| mill feeder speed | X5 | C,B,A,U |
| mill coal flow | X5 | M |
| mill differential pressure | X5 | M |
| mill capacity damper | X5 | C,A,B,U |
| mill primary air flow | X5 | M,P |
| mill temperature | X5 | K,A,C U,P,M |
| mill roller and table seal air dP | X5 | M |
| total combustion air flow | D3 | M |
| total coal flow | D3 | M |
| total feedwater flow | D3 | M |
| total steam flow | D3 | M |
| cold reheater temp. | D2 | M |
| s.h. pass damper | D2 | C,A,U |
| reheater pass damper | D2 | C,A,U |
| hot reheater temp. | D2 | B,M,P |
| reheater spray | D2 | C,A,U |
| reheater spray flow | D2 | M |
| reheater spray valve | D2 | S |
| furnace exit gas temp. | D1 | M |
| retract/extend probe | D1 | S |
| stop/run boiler soot blower | D1 | S |
| stop/run airheater soot blower | D1 | S |
| relief valve control | D1 | A |
| close/open relief valve | D1 | S |
| close/open economizer recirc. valve | D1 | S |
| close/open drum vent | D1 | S |
| close/open mass blow-down | D1 | S |
| close/open downcomer drain | D1 | S |
| close/open s.h. drain | D1 | S |
| close/open s.h. bypass | D1 | S |
| d.a. pressure | C10 | C,K,A U,M,P |
| close/open d.a. bypass valve | C9 | S |
| ⅓ element feedwater control | C9 | S |
| d.a. tank level | C9 | C,A,U |
| drum level | C9 | M,P,K |
| primary air manifold pressure | C6 | M |
| lamp test | C4 | S |
| alarm test | C4 | S |
| alarm reset | C4 | S |
| alarm acknowledge | C4 | S |
| drum saturation temp. | C3 | M |
| primary s.h. outlet temp. | C3 | M |
| furnace s.h. inlet temp. | C3 | M |
| furnace s.h. spray | C3 | C,A,U |
| furnace s.h. outlet temp. | C3 | M |
| furnace s.h. spray flow | C3 | M |
| close/open furnace s.h. spray valve | C3 | S |
| finishing s.h. inlet temp. | C3 | M |
| finishing s.h. spray | C3 | C,K,A,U |
| finishing s.h. outlet temp. | C3 | P,M |
| finishing s.h. spray flow | C3 | M |
| close/open finishing s.h. valve | C3 | S |
| close/open main steam drain | C1 | S |
| close/open auxiliary seal valve | C1 | S |
| close/open ext. seal valve | C1 | S |
| close/open warm-up valve | C1 | S |
| condenser vacuum | C1 | M |
| first stage temp. | C1 | M |
| first stage shell temp. | C1 | M |
| turbine vibration | C1 | M |
| lube oil temp. | C1 | M |
| condenser make-up | B11 | C,K,A,U |
| condenser level | B11 | M,P |
| condenser excess relief valve | B11 | C,A,U |
| d.a. level | B10 | C,K,A U,M,P |
| close/open d.a. ext. valve | B10 | S |
| discharge control valve | B9 | C,K,A,U |
| control valve dP | B9 | M,P |
| stop/run airheaters oil pump | B8, A8 | S |
| stop/run airheaters | B8, A8 | S |
| close/open gas inlet damper | B8, A8 | S |
| close/open secondary air outlet dampers | B8, A8 | S |
| close/open secondary air inlet dampers | B8, A8 | S |
| air heater cold end temp. | B8, A8 | C,K,A U,M,P |
| close/open auxiliary or extraction steam valve | B8, A8 | S |
| close/open primary air outlet dampers | B8, A8 | S |
| close/open primary air inlet dampers | B8, A8 | S |
| close/open forced draft discharge damper | B7, A7 | S |
| stop/run forced draft fan | B7, A7 | S |
| forced draft inlet damper | B7, A7 | C,A,U |
| close/open induced draft discharge damper | B7, A7 | S |
| stop/run induced draft fan | B7, A7 | S |
| induced draft fan inlet damper | B7, A7 | C,A,U |
| close/open primary air discharge damper | B6, A6 | S |
| stop/run primary air fan | B6, A6 | S |
| primary air inlet damper | B6, A6 | C,A,U |
| oxygen master | B3 | C,A,U P,M,B |
| stop/run condenser circulating pump | A11 | S |
| stop/run condenser vacuum pump | A11 | S |
| stop/run condensate pump | A11 | S |
| close/open condensate pump recir. valve | A11 | S |
| close/open condensate pump disch. valve | A11 | S |
| polisher auto/manual control | A11 | A |
| close/open polisher bypass | A11 | S |
| close/open polisher valves | A11 | S |
| close/open l.p. feedwater valves. | A10 | S |
| close/open l.p. bypass | A10 | S |
| close/open l.p. drain | A10 | S |
| close/open h.p. heaters feedwater valves | A10 | S |
| close/open h.p. heaters bypass valves | A10 | S |
| close/open h.p. heater 2 drain to d.a. | A10 | S |
| close/open h.p. heater 2 drain to cond. | A10 | S |
| close/open economizer inlet valve | A10 | S |
| close/open h.p. 1 drain | A10 | S |
| stop/run b.f.p. oil pump | A9 | S |
| close/open b.f.p. warm-up valve | A9 | S |
| close/open b.f.p. seal steam valve | A9 | S |
| close/open b.f.p. aux. steam valve | A9 | S |
| close/open b.f.p. main steam valve | A9 | S |
| close/open i.p. ext. valve (b.f.p.) | A9 | S |
| close/open steam drain | A9 | S |
| close/open feedwater suction valve | A9 | S |
| close/open feedwater discharge valve | A9 | S |
| close/open feedwater recirculation valve | A9 | S |
| b.f.p. speed | A9 | C,A,U |
| fuel master | A3 | C,A,U |
| boiler master | A3 | C,A,U |

TABLE I-continued

| CONSOLE INSTRUMENT OR CONTROL | POSITION | TYPE |
|---|---|---|
| turbine master | A3 | C,A,U |

NOTES
b.f.p. (boiler feed pump)
d.a. (deaerator)
l.p. (low pressure)
h.p. (high pressure)
s.a. (secondary air)
p.a. (primary air)
dP (differential pressure)
i.d. (induced draft)
B (bias adjust)
f.d. (forced draft)
X5 (A5, B5, C5, D5)
s.h. (superheater)
M (meter)
S (switch)
C (demand meter)
P (set point meter)
A (auto/manual switch)
K (set point adjust)
U (increase/decrease switch pair)

Referring again to FIG. 5, it is shown having at its top center, alarm signals in the form of a 4×20 array of annunciator lights 50 that announce various abnormal conditions. The abnormalities can be combinations of the faults listed in Tables IIA and IIB (described further hereinafter) or any other faults determined by the computer through operator error etc. An audible alarm is given by horn 51 which normally is actuated whenever one of the alarm annunciators 50 is actuated. Each of a pair of strip recorders 52A and 52B may be driven with six selected channels of data from the previously mentioned computer. The computer is programmable to allow twelve values generated and/or displayed by the computer to be recorded on strip recorders 52A and 52B. Instrument 54 is a conventional-appearing synchroscope used to verify that the generator is in synchronism with the utility grid lines, an important factor to ascertain before connecting a generator to a power grid.

Four position switch 56 is used as a selector. In this embodiment, the simulator simulates a plant having four coal pulverizing mills which can operate in parallel. The control and ignition of the fuel associated with each of these mills can be controlled, in part from burner master insert panel F5 (described hereinafter in further detail). Rather than incorporating four master panels only one such panel is used, namely panel F5. By changing switch 56, the functioning of panel F5 can be changed so it associates with any one of four mills. The previously mentioned computer responds to the position selected by selector switch 56 to assign data received from panel F5 to the selected simulated mill and to transmit to that panel for display the data associated with that mill.

Figure 10A:
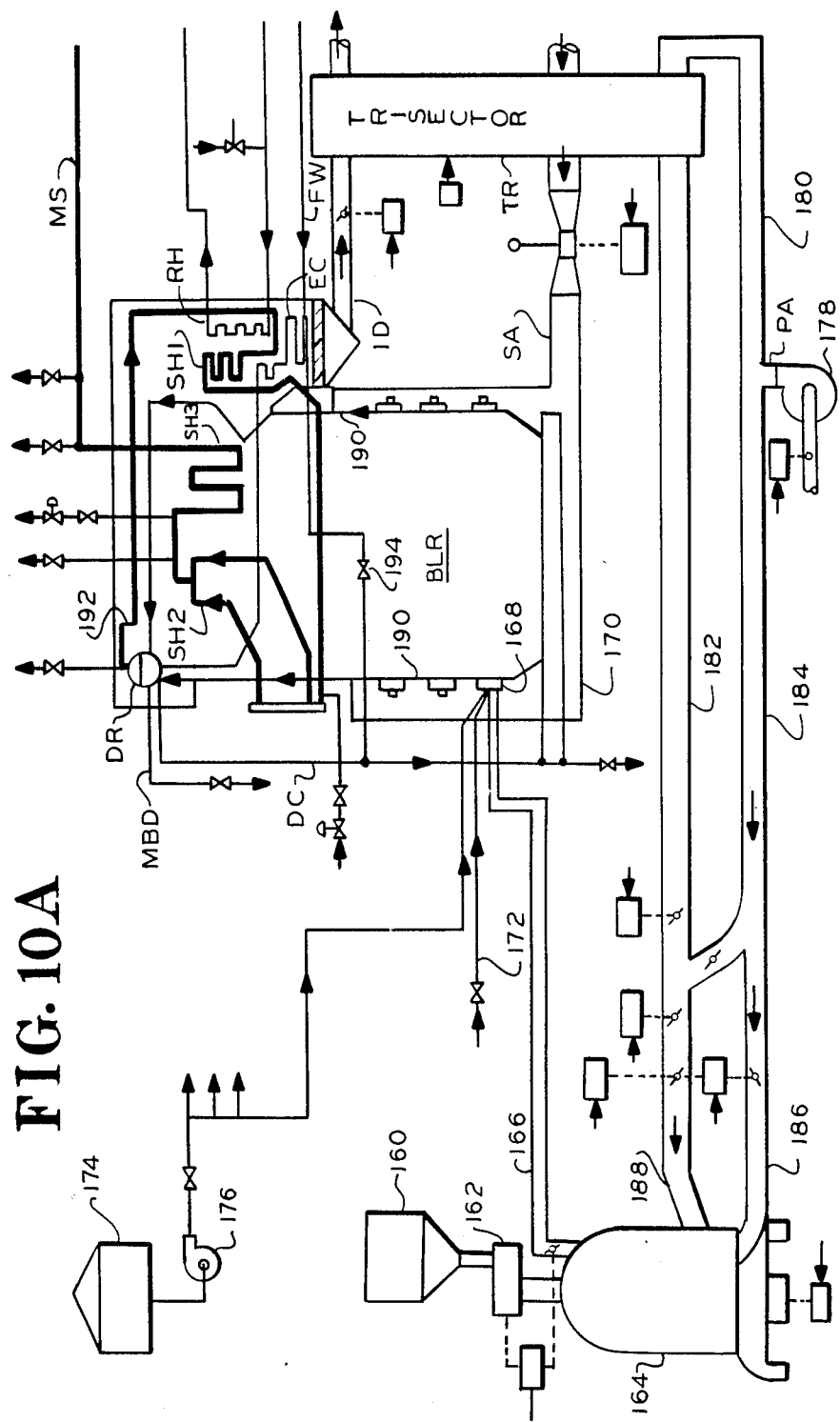
FIGS. 10A and 10B are simplified diagrams of a typical schematic panel as illustrated in FIG. 1.
Figure 10B:
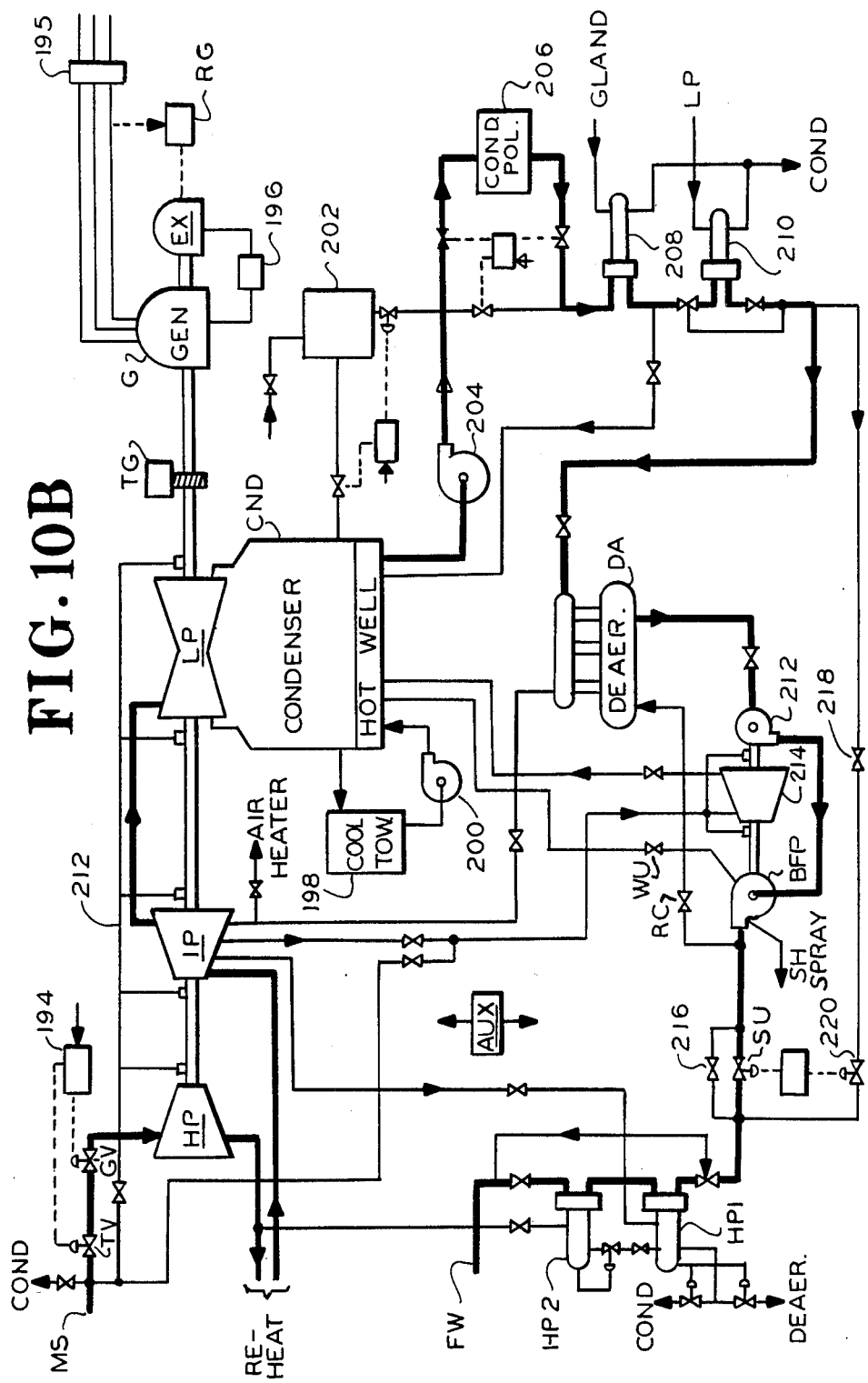

Referring to FIGS. 10A and 10B a simplified schematic d:ragram is given of a typical mimic board corresponding to panel 20 (FIG. 1). The illustrated panel of FIGS. 10A and 10B employs a trisector airheater, a roller-type type pulverizing mill and a natural circulation boiler feeding a high intermediate and low pressure turbine for driving a generator. It will be understood that the schematic of these Figures illustrates a conventional industrial plant being simulated. A coal silo 160 operates through coal feeder 162 to feed the roller-type pulverizer 164. Pulverized coal (and air) conveyed through duct 166 reaches burners 168. The dotted lines connecting to feeder 162 and the damper of duct 166 signify a simulated control system. Burners 168 are encased in air plenum 170 which is supplied with the secondary air (forced draft) through duct SA fed from a conventional trisector airheater TR which includes the conventional start-up steam coil heater. To enable lighting of the coal, oil is fed from a fuel oil tank 174 through fuel oil pump 176 to burners 168. Burners 168 are also fed an atomizing medium to enhance combustion through line 172. The "bow-tie" shaped symbol in the discharge line of pump 176 and elsewhere signifies a block valve which is controlled from the console of FIG. 1.

Trisector airheater TR heats air from primary air fan 178 which is directed along duct 180 through trisector TR onto oulet 182. The primary air fan 178 also feeds tempering air through a mixing duct 184 to duct 182. The mixed air reaches pulverizer 164 by duct 188 to be used as primary air. A seal air supply is provided from duct 184 through duct 186 to the pulverizer 164.

Boiler BLR is a natural circulation boiler having walls formed of water tubes 190. Downcomer line DC connects between the lower end of tubes 190 and drum DR. Drum DR has a valved mass blowdown line MBD. Steam from drum DR can exit from line 192 to flow sucessively through the primary superheater SH1, the furnace superheater SH2 and finishing superheater SH3 to main steam line MS. Feedwater enters boiler BLR along line FW and passes through economizer EC before entering drum DR. Economizer recirculating valve 194 allows water to recirculate through downcomer pipe DC into the ecomomizer EC before returning to drum DR. There is also located in the same section of boiler BLR with the primary superheater SHI and economizer EC, reheater coil RH whose function is described hereinafter. The section containing reheater RH connects to an outlet port to convey exhaust gas through duct ID to the gas inlet of trisector TR. The exhaust gas leaving trisector TR flows through an outlet damper and an induced draft pump (neither shown).

Serially connected between the main steam line MS (FIG. 10B) and inlets of the high pressure turbine HP are throttle valve TV and governor valve GV, both controlled by controller 194. The outlet of high pressure turbine HP is shown connected to allow steam to pass through the reheat line to return to the inlet of intermediate pressure turbine IP. An outlet from turbine IP is shown leading to an inlet of low pressure turbine LP which exhausts to condenser CND shown having a hotwell. The turbines HP, IP and LP are shown connected by a common shaft to the input shaft of generator G. Connected to the shaft between low pressure turbine LP and generator G is a turn gear apparatus TG which can engage a gear on the turbine shaft to rotate it at a predetermined speed. Generator G is shown feeding through breakers 195 to a main power grid. Feedback from these lines through regulator RG is able to control the exciter EX to adjust the field of generator G. Field breaker 196 is shown coupled between exciter EX and generator G to connect when necessary the excitation of the generator.

Condenser CND is shown feeding cooling tower 198 which returns by a circulating water pump 200 back to the heat exchanger in condenser CND. A condensate storage tank 202 is shown being fed from a water treatment plant (not shown) and also connected to convey treated water condenser CND through a controlled valve. Tank 202 is shown coupling at its bottom through a control valve to the discharge port of a condensate feed pump 204 whose inlet connects to the hotwell of condenser CN. The controls around tank 202 shown, typically, as a box with a mechanical outputs to valves and an arrowhead indicating a controlling electrical input. The condensate pump 204 can either bypass or feed through a known condensate polisher 206 designed with the appropriate filtering and chemical reagents to move silica and other unwanted material in the feedwater.

In this embodiment condensate polisher 206 is shown serially connected to a gland steam condenser 208 and a low pressure heater 210. Gland steam condenser 208 is shown fed with a returning gland seal steal which originates from the steam applied through line 212 to the gland seals near the bearings of turbines HP, IP and LP. Heater 210 receives steam returning from low pressure turbine LP. Both heaters 208 and 210 are shown returning steam to the condenser. The junction between heaters 208 and 210 is shown connected through a valve to the hotwell of condenser CND. Also heater 210 is shown with appropriate valves bypassing it. The outlet of low pressure heater 210 is shown feeding through a valve to deaerator DA. This known deaerater is heated with steam from an extraction line of intermediate pressure turbine IP. This heat and the internal structure of deaerator DA acts to efficiently remove oxygen from the feedwater.

A main outlet from deaerator DA connects through a suction valve to a booster pump 212 which feeds a main turbine-driven boiler feed pump BFP. Pumps 212 and BFP are shown driven by the common shaft of turbine 214 which receives drive steam either from the main steam line MS or from the extraction of intermediate pressure turbine IP as selected by the appropriate valve. Steam from turbine 214 returns to the hotwell of condenser CND. One of the outlets of feed pump BFp is shown directed to a known superheater spray which is used for reducing the temperature of superheated steam by spraying liquid water into the superheated steam. The actual schematic involving spraying may be more complicated and a more elaborate arrangement may be shown for delivering spray water separately to the several superheaters. The main discharge of the feed pump BFP is also shown connecting to a recirculating valve RC returning water to deaerator DA. Another discharge port of pump BFP is shown connecting through warmup valve WU to the hotwell of condenser CND. Valve WU allows a closed circulation between the condenser and deaerator DA which may be useful during the warm up stages of the boiler feedpump operation.

The main line, however, of the boiler feed pump BFP feeds either through a boiler feed pump, dishcharge, isolation valve 216 (which is either open or closed by the control system) or through a startup control valve SU which may be continuously regulated by the controls. It will be noted that deaerator DA can be bypassed by opening bypass valve 218 allowing feedwater to be regulated through control valve 220.

The outputs of valves 216, 220 and SU combine to form a flow which may be serially connected through a first high pressure heater HP1 and second high pressure heater HP2. Heater HP1 is fed with steam extracted from turbine IP. Heater HP2 is connected through a valve to receive the extraction steam from turbine HP. Heater HP2 can drain steal to heater HP1. Heater HP1 can, depending upon the selection of the associated valves, return condensate to either condenser CND or deaerator DA. Heaters HP1 and HP2 can be bypassed by the indicated valve. The output of heaters HP1 and HP2 leads to the previously mentioned main feedwater line FW.

Also illustrated in FIG. 10B is an auxiliary steam port AUX which may be derived from another boiler or other source. This auxiliary steam is useful during startup conditions when steam is needed for start-up heat or to set certain initial operating functions in motion.

To simplify the illustration of FIGS. 10A and 10B many of the reference characters that a student would normally expect have been deleted. For example, in an actual panel one would label each of the illustrated valves so that the student understands which valves he is operating when he actuates certain controls on the console panel. Similarly the various control blocks would be labeled to further enhance the students understanding of the functions he is exercising. Also, the diagram itself has been simplified in that various interconnections controlled by valves between the illustrated components have been deleted. Also various check valves and other components not necessary to a basic understanding of the schematic have been deleted. It is to be understood that the schematic need only be made as complicated as the level of understanding which the student needs to reach. Of course, the schematic can be completely revised should one wish to illustrate another plant such as a petroleum cracking or distilling plant.

As previously mentioned an instructor's module may be used to simulate faults in the forgoing plant. Various valves, dampers and other controllable devices or displayed parameters may be driven to an improper value as listed in the following Tables IIA and IIB:

TABLE IIA

| INSTRUCTOR CONTROLLABLE DIGITAL DEVICES/TRANSDUCERS | |
| --- | --- |
| DEVICE DESCRIPTION | FAULT |
| airheater soot blower | stop |
| airheater A or B gas inlet damper | close, open |
| airheater A or B lube oil pump | stop |
| airheater A or B primary air inlet damper | close, open |
| airheater A or B primary air outlet damper | close, open |
| airheater A or B secondary air outlet damper | close, open |
| airheater A or B secondary air inlet damper | close, open |
| airheater A or B | stop |
| air register 1A, 1B, 1C, 1D, 2A, 2B, 2C, 2D, 3A, 3B, 3C, 3D, 4A, 4B, 4C or 4D | close, open lightoff |
| boiler feed pump auxiliary steam valve | close, open |
| boiler feed pump discharge valve | close, open |
| boiler feed pump drain valve | close, open |
| boiler feed pump extraction steam valve | close, open |
| boiler feed pump lube oil pump | stop |
| boiler feed pump main steam block valve | close, open |
| boiler feed pump recirculation valve | close, open |
| boiler feed pump seal steam block valve | close, open |
| boiler feed pump suction valve | close, open |
| boiler feed pump warmup valve | close, open |
| boiler soot blower | stop |
| burner 1A, 1B, 1C, 1D, 2A, 2B, 2C, 2D, 3A, 3B, 3C, 3D, 4A, 4B, 4C or 4D shutoff dampers | open, close |
| chemical feed valve | close, open |
| circulating water pump | stop |
| coal silo valve A, B, C or D | not open |
| combustion control power | loss |
| condensate pump discharge valve | close, open |
| condensate pump recirculation valve | close, open |
| condensate polisher block valve | close, open |
| condensate polisher bypass valve | close, open |
| condensate pump | stop |
| condensate storage tank makeup valve | close, open |
| deaerator bypass startup block valve | close, open |
| deaerator extraction steam block valve | close, open |

TABLE IIA-continued
INSTRUCTOR CONTROLLABLE DIGITAL DEVICES/TRANSDUCERS

| DEVICE DESCRIPTION | FAULT |
|---|---|
| downcomer drain valve | close, open |
| drum vent valve | close, open |
| economizer inlet block valve | close, open |
| economizer recirculation valve | close, open |
| electromatic valve | close, open |
| emergency reheater spray block valve | close, open |
| furnace exit gas temperature probe | in, out |
| forced draft fan A or B | stop |
| forced draft fan A or B discharge damper | close, open |
| feeder A, B, C or D | stop |
| field breaker | close, open |
| finishing superheater spray block valve | close, open |
| furnace superheater spray block valve | close, open |
| generator breaker | close, open |
| high pressure heater 1 drain valve | close, open |
| high pressure heater 1 & 2 feedwater block valve | close, open |
| high pressure heater 2 drain valve to condenser | close, open |
| high pressure heater 2 drain valve to deaerator | close, open |
| high pressure heater 1 & 2 feedwater bypass valve | close, open |
| induced draft Fan A or B | stop |
| induced draft Fan A or B discharge damper | close, open |
| igniter atomizing pressure | not okay |
| igniter flame 1A, 1B, 1C, 1D, 2A, 2B, 2C, 2D, 3A, 3B, 3C, 3D, 4A, 4B, 4C, or 4D | on, off |
| igniter fuel oil pump | stop |
| igniter gun 1A, 1B, 1C, 1D, 2A, 2B, 2C, 2D, 3A, 3B, 3C, 3D, 4A, 4B, 4C or 4D | extend, retract, not coupled |
| igniter header press | high, low |
| igniter trip valve | open, close |
| igniter valve 1A, 1B, 1C, 1D, 2A, 2B, 2C, 2D, 3A, 3B, 3C, 3D, 4A, 4B, 4C or 4D | open, close |
| instrument air | loss |
| low pressure heater drain valve | close, open |
| low pressure heater feedwater block valve | close, open |
| low pressure heater feedwater bypass valve | close, open |
| mill A, B, C or D lube oil pressure | low |
| mass blowdown valve | close, open |
| feeder A, B, C or D belt | no coal |
| mill A, B, C or D lube oil pump | stop |
| mill A, B, C or D inert | stop |
| main flame 1A, 1B, 1C, 1D, 2A, 2B, 2C, 2D, 3A, 3B, 3C, 3D, 4A, 4B, 4C or 4D | on, off |
| main steam drain valve | close, open |
| main turbine lube oil pump | stop |
| main turbine gland seals auxiliary steam block valve | close, open |
| main turbine gland seals main steam block valve | close, open |
| primary air fan A or B | stop |
| primary air shutoff damper A, B, C OR D | close, open |
| primary air fan A or B discharge damper | close, open |
| pulverizer A, B, C or D | stop |
| runback stator coolant | fail |
| seal air shutoff damper A, B, C or D | close, open |
| steam coil airheater auxiliary steam block valve | close, open |
| scanner air fan A or B | stop |
| superheater bypass valve | close, open |
| superheater drain valve | close, open |
| turning gear | stop |
| unit trip | fail |
| vacuum pump | stop |
| voltage regulator selection | fail |

TABLE IIB
INSTRUCTOR CONTROLLABLE ANALOG DEVICES/TRANSDUCERS

| DEVICE DESCRIPTION | FAULT |
|---|---|
| Airheater A or B gas inlet temperature | 0-100% |
| airheater A or B gas outlet temperature | 0-100% |
| airheater A or B primary air inlet temp. | 0-100% |

TABLE IIB-continued
INSTRUCTOR CONTROLLABLE ANALOG DEVICES/TRANSDUCERS

| DEVICE DESCRIPTION | FAULT |
|---|---|
| airheater A or B primary air outlet temp. | 0-100% |
| airheater A or B secondary air inlet temp. | 0-100% |
| airheater A or B secondary air outlet temp. | 0-100% |
| ambient air temperature | 0-100% |
| analyzer $O_2$ | 0-100% |
| boiler feed pump barrel temperature | 0-100% |
| boiler feed pump discharge pressure | 0-100% |
| boiler feed pump pressure | 0-100% |
| boiler feed pump steam control valve | 0-100% |
| condensate conductivity analyzer | 0-100% |
| cold reheater inlet temperature | 0-100% |
| boiler feed pump discharge control valve | 0-100% |
| condensate discharge flow | 0-100% |
| condensate excess relief control valve | 0-100% |
| condenser make-up control valve | 0-100% |
| condensate make-up flow | 0-100% |
| condensate tank level | 0-100% |
| condensate polisher differential pressure | 0-100% |
| condensate hotwell temperature | 0-100% |
| condenser vacuum | 0-100% |
| condensate pH analyzer | 0-100% |
| condensate pump discharge pressure | 0-100% |
| deaerator bypass valve | 0-100% |
| deaerator level control valve | 0-100% |
| deaerator outlet temperature | 0-100% |
| deaerator pressure control valve | 0-100% |
| drum level | 0-100% |
| drum pressure | 0-100% |
| drum saturation temperature | 0-100% |
| economizer inlet temperature | 0-100% |
| exciter voltage | 0-100% |
| forced draft fan A or B discharge pressure | 0-100% |
| forced draft fan A or B inlet damper | 0-100% |
| finishing superheater inlet temperature | 0-100% |
| finishing superheater outlet pressure | 0-100% |
| finishing superheater spray control valve | 0-100% |
| finishing spray flow | 0-100% |
| first stage turbine steam pressure | 0-100% |
| first stage turbine steam temperature | 0-100% |
| first stage turbine shell temperature | 0-100% |
| furnace pressure | 0-100% |
| furnace superheater inlet temperature | 0-100% |
| furnace superheater spray control valve | 0-100% |
| furnace spray flow | 0-100% |
| generator megawatts | 0-100% |
| generator voltage | 0-100% |
| governor valve | 0-100% |
| hot air damper mill A, B, C or D | 0-100% |
| high pressure heater 2 outlet temperature | 0-100% |
| induced draft fan A or B inlet damper | 0-100% |
| induced draft fan A or B suction pressure | 0-100% |
| igniter fuel flow | 0-100% |
| low pressure heater outlet temperature | 0-100% |
| mill A, B, C or D differential presssure | 0-100% |
| primary air header pressure | 0-100% |
| primary air capacity damper A, B, C or D | 0-100% |
| primary air fan A or B inlet damper | 0-100% |
| primary superheater outlet temperature | 0-100% |
| pulverizer A, B, C or D coal flow | 0-100% |
| reheat outlet pressure | 0-100% |
| reheater inlet pressure | 0-100% |
| reheater spray control valve | 0-100% |
| reheater pass damper | 0-100% |
| reheater spray flow | 0-100% |
| turbine speed | 0-100% |
| grinding roller seal differential pressure mill A, B, C or D | 0-100% |
| steam coil airheater A or B valve | 0-100% |
| secondary air flow | 0-100% |
| superheater pass damper | 0-100% |
| silica analyzer | 0-100% |
| steam flow | 0-100% |
| synchroscope | 0-100% |
| tempering air damper mill A, B, C or D | 0-100% |
| table seal differential pressure, mill A, B, C or D | 0-100% |
| throttle pressure | 0-100% |
| throttle valve | 0-100% |

TABLE IIB-continued

INSTRUCTOR CONTROLLABLE ANALOG DEVICES/TRANSDUCERS

| DEVICE DESCRIPTION | FAULT |
| --- | --- |
| turbine driven boiler feed pump speed | 0–100% |
| total feedwater flow | 0–100% |
| turbine bearing lube oil temperature | 0–100% |
| turbine vibration | 0–100% |
| windbox/furnace differential pressure | 0–100% |

Figure 7:
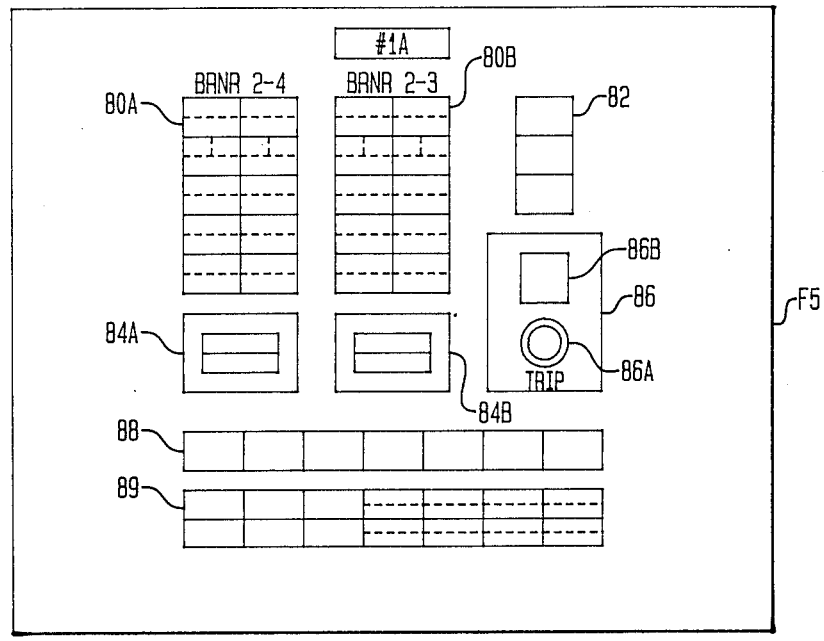
FIG. 7 is a detailed frontal view of the burner master, insert panel illustrated in FIG. 5.

Referring to FIG. 7, the burner master insert panel F5 is illustrated in further detail. As previously mentioned, selector 56 can change the significance of this panel to refer to any one of four similar substages. In this case one of four identical pulverizers is selected. Panel F5 has a plurality of igniter permissive indicators 80A and 80B associated with burner rows 2 and 4 and burner rows 2 and 3, respectively. These permissive indicators establish whether certain preconditions are satisfied before an operator is allowed to operate an oil igniter which may be used in turn to ignite coal. The igniter permissives include indcations whether a burner flame exists in any of the relevant burners, an indication whether the relevant igniters are extended and coupled, indications whether the igniter oil valves are open or closed, indications whether the associated burner shut-off dampers are open or closed, indications whether the associated burner air registers are open or closed and indications whether the burner air registers are in a lightoff condition. Three push button select switches shown in group 82 are used to select either pair 1, 4 or pair 2, 3 or all burners. Instruments 84A and 84B show the scanned level of the burner flames.

A mill emergency trip panel 86 has an emergency push button 86A and a display window 86B which can display the reason for an automatic or manual trip. Examples of displayed messages can be loss of lube oil; an operator trip; a trip because of a running pulverizer; loss of all flame; failure of the primary air damper to be open; failure of the proper air registers to be open; a coal silo valve improperly closed; all the burner shut off dampers closed; a loss of the pulverizer seal air; loss of the igniter; or a high pulverizer exit temperature.

Indicators and manual controls are contained in row 88. In one embodiment associated with a roller-type pulverizer, these indicators indicate whether the seal air damper was closed, the primary air damper was closed, the hot air damper was closed, a mill sweep was required, a mill was inerted and the mill load was at a predetermined minimum. Also included in row 88 are status lights indicating that feeder and primary air damper control has been released to an automatic mode. Finally, rows 89 signify various manual controls over the igniter, burner air registers, etc. Specifically, there is provided an igniter start and stop switch and controls for: opening/closing burner air registers; burner air register light off; lamp tests; closing/opening burner shutoff damper; running/stopping lube oil pump; running/stopping the pulverizer; and running/stopping the feeder. The latter four have ready lights associated with them and the pulverizer ready light may be deemed a "burner ready" indicator. The above igniter and pulverizer start switches may be deemed a burner start switch.

Figure 8:
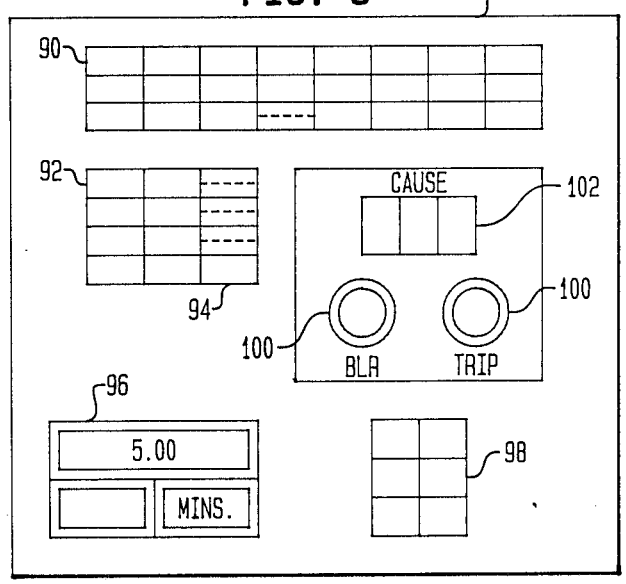
FIG. 8 is a detailed frontal view of the fuel safety, insert panel of FIG. 5.

Referring to FIG. 8, previously mentioned fuel safety insert panel F4 (FIG. 5) is shown having a 3×8 array 90 of twenty four purge precondition indicators. The permissive indicators in array 90 provide indications to the student that: forced draft fans are running with dampers open, induced draft fans are running with dampers open, the igniter oil trip valve is closed, all pulverizers are stopped, all burner shutoff dampers are closed, all primary air shutoff dampers are closed, all igniter valves are closed, no boiler trip condition is present, primary air fans are stopped with proper duct pressure, airheaters are running, scanner cooling air fan is running with normal pressure, all air registers are in light off condition, air flow is greater than 30%, superheater regulating dampers are open, reheater regulating dampers are open, the forced draft crossover duct is closed, the air preheater isolation dampers are open, and the furnace pressure is in proper limits. Additionally, array 90 provides and indication that a purge is required, in progress, interruped or completed. Additionally, the operator may operate a purge start switch in array 90 to commence purge. Also a switch is provided to reset the simulated master fuel trip relay and also to test the lamps in the array.

Also provided in the two columns of indicators 92 are a plurality of igniter prelight permissives. Included in group 92 are manual controls for opening and closing the igniter oil trip valve as well as indications of the status. thereof. Also indicated are normal igniter oil header pressure, normal atomizing steam differential pressure, proper scanner air, proper tertiary air, adequate boiler air flow, resetting of the master fuel trip and igniter fuel trip relays. Also given is a light indicating permission to light the igniters which may be considered another "burner ready indication".

A column of indicators 94 is associated with certain condtions which must be met before lighting coal. An indication is given of whether the system is ready to allow starting of the primary air fans and whether they are running. Also indicated is whether the primary air duct pressure is normal and whether its fan discharge damper is open. Also indicated is whether the APH run damper is open. If all permissives are satisfied an indication is given from array 94 that permission is granted to light coal, another type of "burner ready" indicator. Numeric display 96 indicates time elapasing during the purge interval which is described hereinafter. An array of manual switches 98 is associated with placing the various scanner igniter fans in a run, stop or standby condition.

A pair of boiler emergency trip switches 100 are illustrated for manually stopping all fuel feed to a simulated boiler in a time of simulated emergency. Also the boiler may be automatically tripped by the computer. In either case, the cause is displayed in one of the three. windows 102. Possible causes of the trip which may be displayed in the windows 102 are as follows: all igniter valves are closed, high or low igniter oil header pressure, igniter trip valve closed, low atomizing steam differential pressure, operator trip, loss of forced draft fans, loss of primary air, high or low furnace pressure, feeders tripped for no igniters, delayed lighting of first igniter, high or low drum level, low air flow, loss of combustion control power, loss of induced draft fan, loss of all main flame, loss of instrument air, loss of all flame, turbine trip, unit trip, last igniter out, no FDR running.

Figure 9:
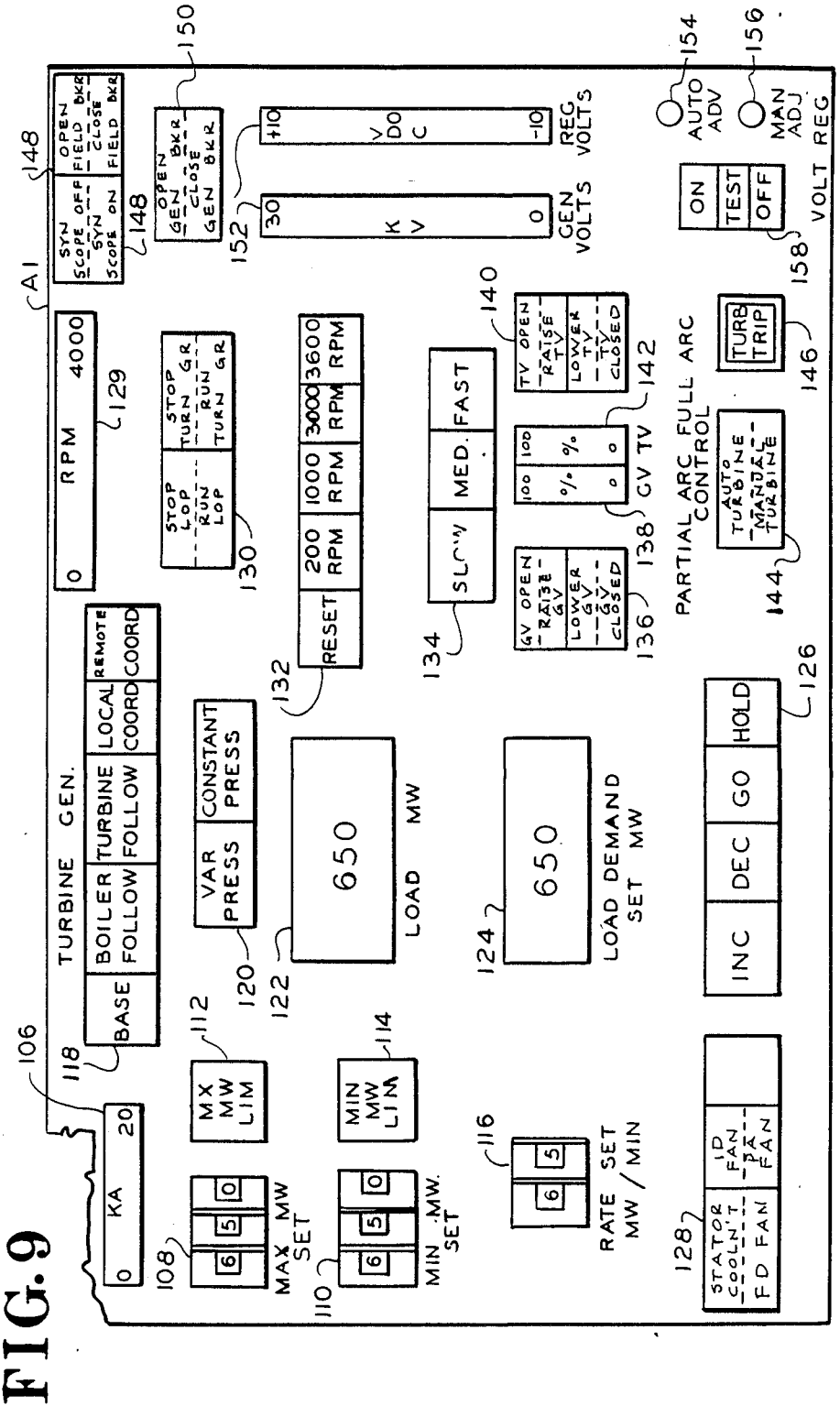
FIGS. 9A and 9B, collectively referred to as FIG. 9, is a detailed frontal view of the turbine master, insert panel of FIG. 5.
Figure 9A:
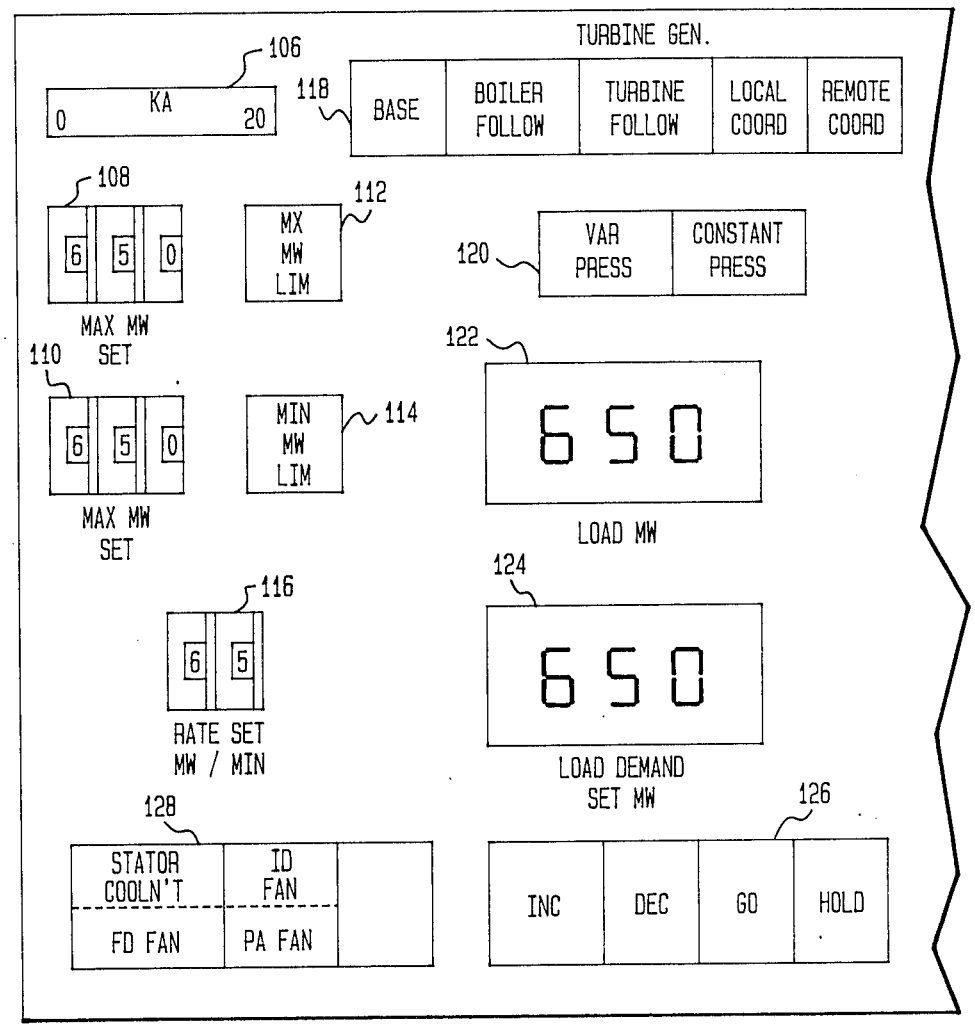
Figure 9B:
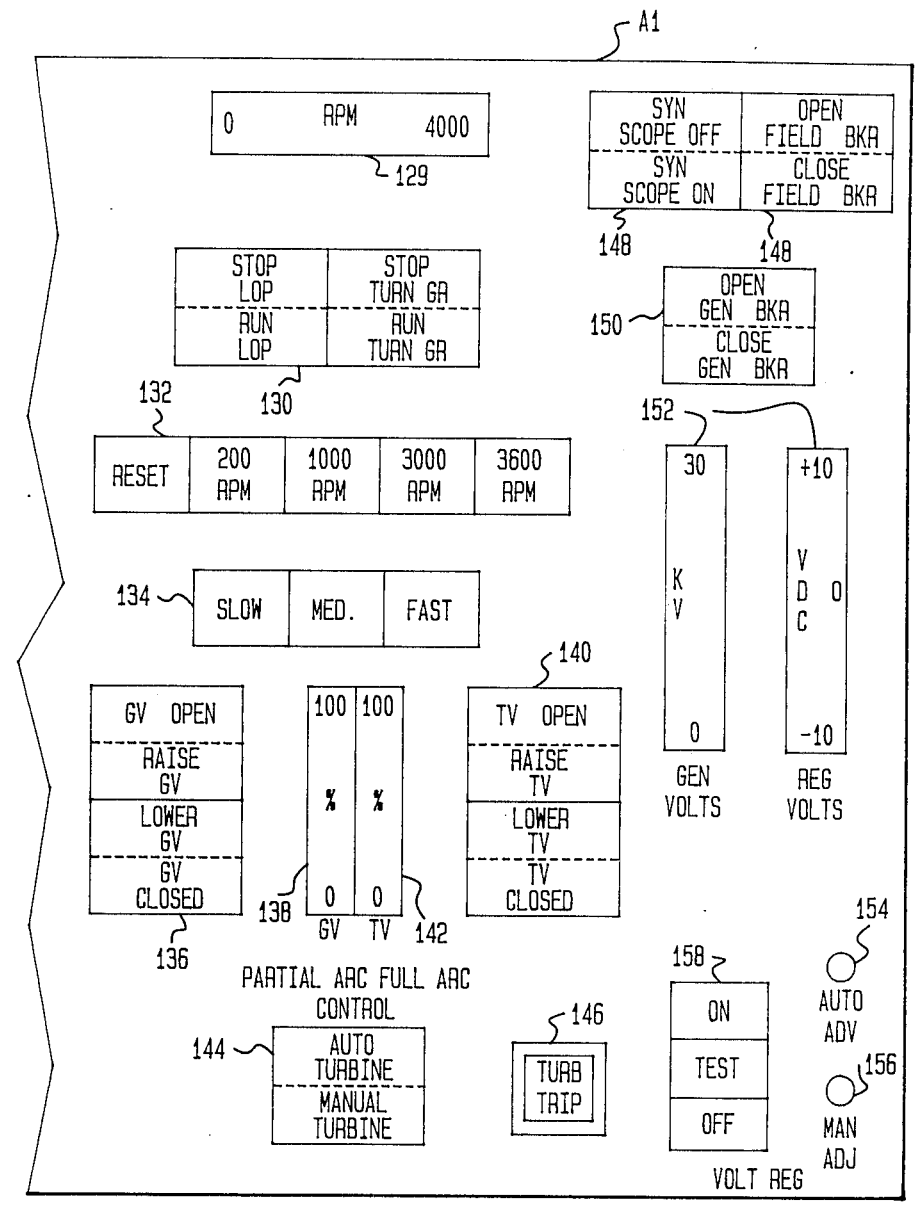

Referring to FIG. 9, previously mentioned turbine master insert panel A1 of console 14 is illustrated in further detail. panel A1 includes a generator current output meter 106. Below meter 106 are two thumbwheel switches 108 and 110 for setting computer readable numerical data which signify a desired setting for the maximum and minimum megawatt output from a generator. Associated with switches 108 and 110 are indicators 112 and 114 indicating whether a maximum or minimum power limit has been reached. Switches 116 are similar to the previously described thumbwheel switches and are computer readable to demand a maximum rate of change of power output from the simulated generator.

A row of push button switches 118 place the simulated turbine/generator in one of five modes (described hereinafter) as follows: base, boiler follow, turbine follow, local coordinated or remote coordinated. Also a pair of push button switches 120 can inform the computer that operation is desired either in a variable or constant pressure mode, as further described hereinafter. Digital meters 122 and 124 indicate the simulated actual load in megawatts and the demanded load in megawatts, respectively. Push button switches 126 are used for increasing or decreasing the setting of demand meter 124 as well as for causing that demand to become effective or to hold at the present value. Indicators 128 signify the proper condition for various parameters associated with the turbine generator such as stator coolant, the forced draft, induced draft and primary air fan status. Meter 129 displays turbine angular velocity. Switches 130 allow an operator to stop or run the turbine lube oil pump and the turbine turn gear. Push button switches 132 allow an operator to inform the computer of a desired target speed for the turbine. Push button switches 134 allow a student to inform the computer of a desired rate of change of turbine speed. Switches 134, labeled slow, medium and fast correspond to a angular acceleration of 120, 180 and 360 RPM per minute. Alternately actuatable switches 136 allow a student to either raise or lower the governor valve and observe an indication of the simulated change by governor valve meter 138. Similarly, the throttle valve can be be adjusted by alternately actuatable switches 140 as the student observes throttle valve change through throttle valve meter 142.

In the event that the student does not wish to manually control the governor or turbine valve he may select an automatic mode through switch 144, causing switches 118 to become effective. A turbine trip 146 is also provided to eliminate the simulated drive to the turbine. Switches 148, as labeled, actuate the synchroscope and operate the simulated field breaker. Switch 150 may be used by the student to simulate opening or closing of the generator breaker. Meters 152 indicate the simulated generator and regulator output voltage. The voltage regulator can be adjusted in either the automatic or manual mode by control knobs 154 and 156, respectively. Similarly, the voltage regulator can be turned on, off or tested by alternately actuatable switches 158.

Figure 11:
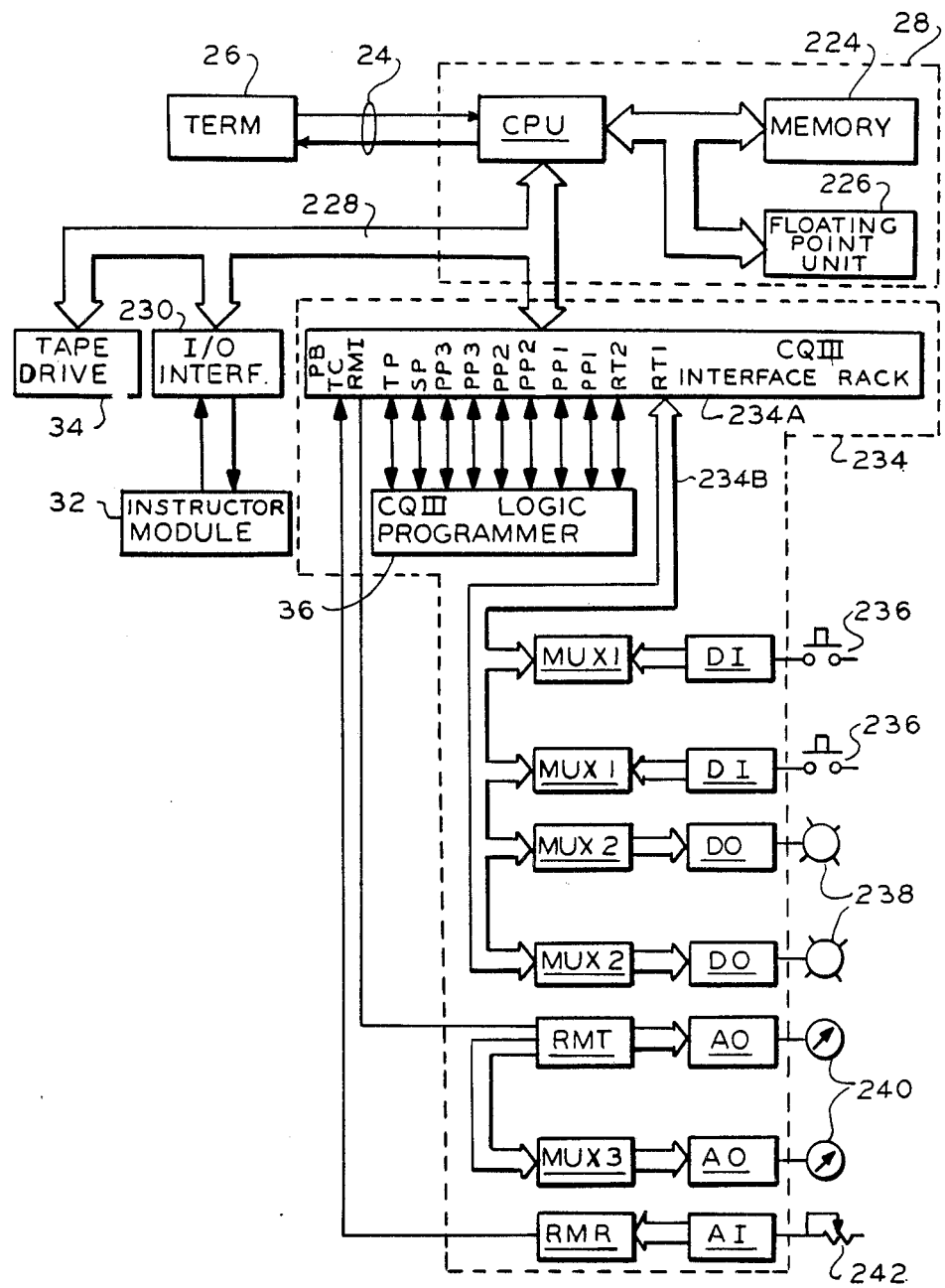
FIG. 11 is a schematic block diagram of the electronic arrangement of FIG. 1.

Referring to FIG. 11, a schematic block diagram is given of the electronics associated with the apparatus of FIG. 1. Previously illustrated computer 28 is shown herein comprising central processing unit CPU, memory 224 and a floating point unit 226 all of which are part of the commercially available minicomputer described previously. A parallel bus line 228 is shown connecting to the previously described cassette tape drive 34 and also to an input/output interface 230. Interface 230 is a conventional interface used to buffer data. Typically, interface 230 will include appropriate shift registers for storing data which are then exchanged between instructor's module 32 and the bus 228, in the conventional fashion. Also shown are previously mentioned lines 24 connecting the previously illustrated terminal 26 to computer 28.

Subsystem 234 is part of the equipment which one might use in an actual plant. Subsystem 234 is composed of components each of which have already been used to control a plant such as a utility plant. The components within subsystem 234 may be part of what is referred to as a CQIII burner management system manufactured by Forney Engineering Company of Addison, Texas. A disclosure of suitable apparatus for performing the task of subsystem 234 can be found in previously mentioned U.S. Pat. No. 3,975,662. Logic programmer 36 (previously illustrated in FIG. 4) may be obtained from Forney Engineering as their CQIII type Logic Programmer. Interface rack 234A is a rack containing a series of plug-in printed circuit boards allowing bus 228 to communicate with the balance of the equipment illustrated herein. Rack 234A may be part of a digital control actually used to digitally control a plant. In particular, rack 234A may include circuit boards identified herein as cards PB, TC, RMI, TP, SP, PP3 (two), PP2 (two), PP1 (two), RT2 and RT1. An example of such cards are those manufactured by Forney Engineering of Addison, Texas and sold under their part numbers 305121-01: 36865-01; 304777-01; 35843-01; 35847-01; 35839-01; 35835-01: 3531-01; 35851-01 and 35827-01, respectively. primarily, rack 234A provides the appropriate interconnection, gating and, in some cases, buffering necessary to interface computer 28 with the logic programmer 36 and the other illustrated components.

A series of multiplexers MUX1 and MUX2 are illustrated herein connected in parallel on bus line 234B to card RT1. Multiplexers MUX1 and MUX2 are conventional data multiplexers which convey digital data when selected by the computer CPU. An example of such a multiplexer are the ones sold by Forney Engineering, part numbers 32389-01. Manually generated digital data from switches 236 (see FIG. 6I) for the multiplexers can be latched into data input cards DI, for example an input card from Forney Engineering, part number 32644-01. Also two of the multiplexers MUX2 are shown conveying digital output data which is latched in conventional latches DO to drive indicator lights 238 (for example, lights 50 of FIG. 5). Alternatively, the latches may be obtained from Forney Engineering, their part number 305172-01.

Digital data is shown issuing on a line from card RMI to transmitter card RMT. This card may have the appropriate buffers to store digital data. Alternatively, this card may be obtained from Forney Engineering, their part number 303445-01. The digital data conveyed through card RMT may be issued directly to an associated digital to analog converter AO. This digital to analog converter can use commercially available converters or Forney part number 327527-01. The RMT card can also feed its output signal through a plurality of multiplexers MUX3, constructed identically to the previously mentioned multiplexers MUX1 and MUX2. Each multiplexer MUX3 cooperates with another digital to analog converter AO identical to those previously described. Each of the converters AO are shown driving an indicator 240 such as previously described meter 62 (FIG. 6A). Another input is shown from a manually operable control such as potentiometer 242 (see knob 78, FIG. 6F) connected to what may be a conventional analog to digital converter AI. Alternatively, Forney Engineering part number 327474-01 may be used instead. The data converted to digital form may be buffered through an appropriate shift register or storage register on card RMR to provide an output in the appropriate form to card RMI. Although conventional registers may be used it is preferred to use Forney Engineering part number 303735-01 for card RMR.

It will be appreciated that the apparatus of subsystem 234 provides an interface between the various elements 236, 238, 240 and 242 and the computer 28. Various alternate equipment may perform the exchange of data between such a computer and its input and output devices. Indicators 240 may for an embodiment involving a boiler driven turbine-generator include: a throttle meter; a throttle pressure meter showing throttle output pressure to the turbine; a boiler rate meter to indicate the heat being delivered to the boiler; and a megawatt meter to show the power output from the turbine driven generator. A more complete list of the instruments usable in such a simulator is given in Table I.

Figure 12:
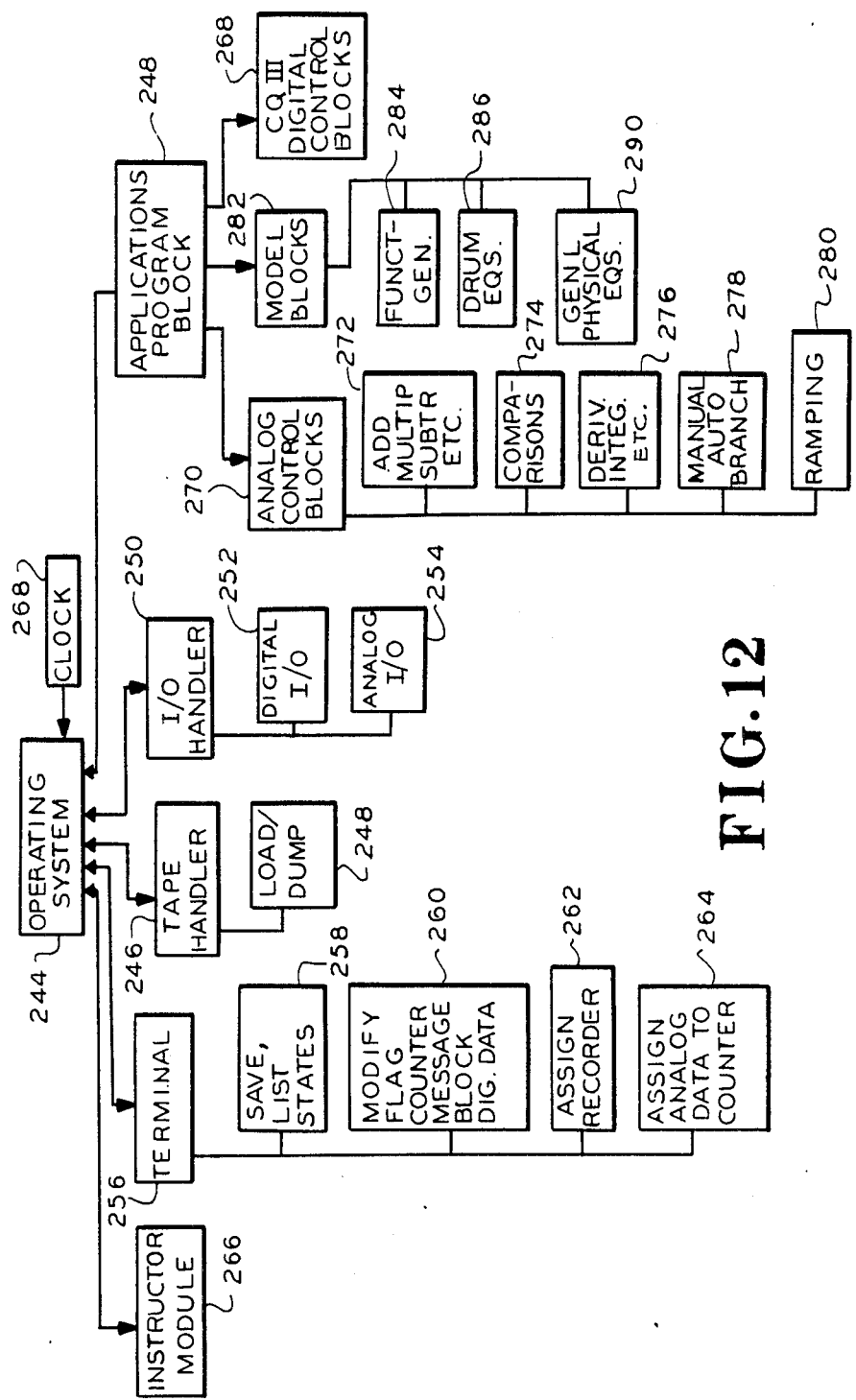
FIG. 12 is a block diagram of the software associated with the computer of FIG. 1.

Referring to FIG. 12, it illustrates the system architecture of the program executed by the above mentioned computer. Operating system 244 is primarily an operating system provided by the manufacturer of the mini-computer 28 (FIG. 11). This operating system allows the running of several related programs. It is preferred that the operating system allows multi-tasking of the programs so that they appear for practical purposes as if they were running simultaneously. The operating system of such a commercially available computer can also provide a hierachy among various subsystems of the software. For example, the software associated with operating the tape handler 246 may be given a relatively low priority in that the applications programs blocks 248 must reach a quiescent condition before tape handler block 246 is handled. As shown in the diagram of FIG. 12, tape handler blocks 246 primarily concern the loading and dumping of data from or to a cassette, as indicated by blocks 248. Another portion of the program concerned with handling input and output operations is indicated by blocks 250. In this subsystem the input and ouput operations are divided between digital blocks 252 and analog blocks 254. Basically the application program blocks 248 interact with the input/output handler 250 to allow tranfers of data at times required by the applications program blocks 248.

A separate input/output system is provided by terminal blocks 256. Basically, blocks 256 allow the terminal to interact with the application program blocks 248 which may be running at a time when the terminal is in use. This subsystem 256 has a series of blocks 258 involved with saving various states or program instructions and also with listing states at which the program may be. Another group of blocks 260 is associated with modifying through the terminal various flags, counters, messages and blocks of digital data. The terminal can also operate through blocks 262 to assign the previously mentioned recorders (strip recorders 52A and 52B of FIG. 5). By issuing appropriate instructions at the main terminal, the recorders can make a record of any particular selected parameter. Also blocks 264 allow the terminal to interact with the application program blocks 248 to change and exchange various analog data with program counters. Additionally, instructor module blocks 266 are essentially program blocks allowing the use of an additional terminal which may also interact with the applications program blocks 248 as they are running. The operating system 244 has a program clock 268 which allows the system to sense time and thus operate on a real time basis.

The main purpose of the operating system 244 is to allow running of the applications program blocks 248. In certain large, general purpose computers, the major applications programs may be run effectively similtaneously. However, in more practical embodiments it is anticipated that the various blocks will be given a priority so that there will be a hierarchy of interrupts. In the preferred embodiment the applications blocks are divided into three classifications: digital, analog and modeling. The digital control blocks 268 (also referred to as a digital means) are a series of programming instructions which may take the form described in U.S. Pat. No. 3,975,622. The particular program written will depend upon the type of industrial plant being simulated. As described in the foregoing patent the digital control blocks can determine whether various parameters of a plant are in a proper state. Additionally, the apparatus can set and index various counters. Additionally, the system of blocks 268 can initiate and test various timers. Accordingly the blocks 268 can analyze all relevant digital system inputs, counters, flags and timers to make certain logical decisions. It will be appreciated that the nature of the program developed for digital blocks 268 would be equivalent to that developed to digitally control an actual industrial plant. To this extent, the present system can merely adopt existing digital controls, thereby providing a highly accurate replication of the digital controls and reducing the amount of design time required.

Another major portion of the application program blocks 248 are the analog control blocks 270, also referred to as an analog means. Digital control blocks 268 and analog control blocks 270 taken together form a control means. Analog control blocks 270 are basically programmed equations which allow processing of continuously variable data. For example, a "measured" flow rate can be integrated to arrive at a volume. These various control blocks are used to derive the typical control values for regulating the operation of the associated industrial plant. More specifically in terms of a simulator, the analog control blocks provide continuous output data which can be further coupled to modeling program blocks 282 to affect them. Also the analog control block 270 provide original calculated data that may be displayed on one of the many indicators on simulator console C (FIG. 5). Typical blocks among the analog control blocks are subroutines 272 to add, multipy, subtract and perform other routine mathmatical calculations. Other blocks 274 are involved with conventional comparisons. Blocks 276 involve evaluation of integrals and derivative. Blocks 278 are associated with repeating subroutines involved with changing a simulated system from a manual to an automatic mode. Other analog control blocks 280 are involved with providing often used functions, such as a function that ramps in time.

A third major portion of the program blocks 248 are the model blocks 282, herein referred to as a model means. Mathematical modeling of complicated systems such as a boiler is not a new area of investigation. Many standard texts exist that offer sets of equations and flow charts for modeling such systems. See, for example, Proceedings of the Seminar on Boiler Modeling, David A. Berkowitz, Editor, published October 1975 by the Mitre Corporation, Bedford, Massachusetts. In this preferred embodiment, model blocks 282 may be broken down into groups such as function generators 284 which can transform an input according to a piecewise linear transfer characteristic. Blocks 286 embody certain equations dedicated to characterizing significant portions of the plant such as drum equations described further hereinafter. There will be a host of general physical equations in blocks 290 used to model certain common subsystems such as heat exchangers, pipes, valves, etc.

Table III below lists typical blocks which may be used for modeling and controlling the simulator. Most of the functions are self-evident. Several will be discussed as follows: Blocks DRUMHF, DRUMLHB, DRUMLL, DRUMP and DRUMVV are physical equations associated with modeling of the physical process in the drum of the boiler. These equations can use conventional thermodynamic principles and include within them geometry and size coeffecients that are appropriate for the plant being simulated. Block FLAME makes a stoichiometric comparison to determine whether the fuel can be completely consumed since excess fuel can cool a flame and extinguish it. Block DBLKOI is merely a software trouble shooting block for exercising various inputs and outputs. Blocks FLOCOR and QAPPRX are an iterative equation for calculating a flow using momentum balance concepts. Such momentum balance concepts are well known in physics and thermodynamics. Block FLOW calculates flow based on a simple pressure drop calculation. Equations GPRESS and LPRESS are used to calculate gas and liquid pressure, respectively, through conventional piping equations. Block PUMPP calculates pump pressure by integrating the energy balance to a known manner. Block TBCONDS calculates condensation temperature using first law equations. Specifically, it employs specific heat and a heat to mass ratio. Block TGAS calclulates gas temperature based on a heat flow and mass flow. Block TEMPOB calculates an outlet temperature as a function of an inlet temperature, a heat transfer coefficient, the thermal conductivity of steel and a time constant. Block TFUEL calculates the fuel temperature from a primary air temperature/flow and a coal temperature/flow together with their specific heats. Block THRTCB calculates a thermal time constant as a ratio of the product of mass and specific heat of steel to the product of mass flow and specific heat of a fluid. Block TRANSF1 is a transfer function giving a first order time lag.

TABLE III

| MODEL AND CONTROL BLOCKS | |
|---|---|
| ABSF | calculates the absolute value of the input |
| ADDI | calculates the sum of two units |
| AFUN | generates a piecewise linear function |
| AVER | calculates the average of the inputs |
| BCDCON | converts BCD to a decimal number |
| COMPHI | outputs a "1" if input 1 higher than input 2 |
| COMPLO | outputs a "1" if input 1 lower than input 2 |
| CLAMP | applies rate & magnitude limits to the input |
| DBLKOI | exercises analog inputs & outputs |
| DEADT | delays input a specified time period |
| DERIV | calculates the time derivative of the input |
| DIVI | calculates the quotient of two inputs |
| DRUMHF | calculates drum heat flow |
| DRUMLHB | calculates drum liquid heat balance |
| DRUMLL | calculates drum liquid level |
| DRUMP | calculates drum pressure |
| DRUMVV | calculates drum vapor volume |
| EXPF | calculates the exponential of the input |
| FLAME | calculates the excess air & flame existence |
| FLOCOR | calculates a flow correction factor |
| FLOW | calculates flow |

TABLE III-continued

| MODEL AND CONTROL BLOCKS | |
|---|---|
| GPRESS | calculates gas pressure |
| HIALM | sets alarm when input is higher than set point |
| HISEL | selects the highest input |
| INCNTR | scales a CQIII counter to engineering units |
| IDIG | stores the status of a CQIII digital input |
| INDIFF | integrates the difference between two inputs |
| INTGRL | integrates the input |
| LOALM | sets alarm when input is lower than set point |
| LOSEL | selects the lowest input |
| LPRESS | calculates liquid pressure |
| MASTA | selects automatic input or manual input |
| MULTI | calculates the product of two inputs |
| OCNTR | scales engineering units to a CQIII counter |
| ODIG | sets a CQIII digital on |
| PID | proportional integral derivative controller |
| PRDROP | calculates pressure drop |
| PROD | calculates the product of the inputs |
| PUMPP | calculates the pump pressure |
| QAPPRX | calculates flow |
| RATIO | calculates product of the input and a constant |
| RAMP | ramps from one input to another at a given rate |
| RPOWER | coefficient times input raised to a power |
| SISEL | selects one of two inputs based on CQIII device |
| SQRTF | calculates the square root of the input |
| SUBT | calculates the difference between two inputs |
| SUM | calculates the sum of the inputs |
| TBCONDS | calculates the condensation temperature |
| TGAS | calculates the gas temperature |
| TEMPOB | calculates the outlet temperature |
| TFUEL | calculates the fuel temperature |
| THRTCB | calculates the thermal time constant |
| TRACKM | selects manually tracked input to a controller |
| TRANSFI | calculates the first order lagging transfer function of the input |

Figure 13A:
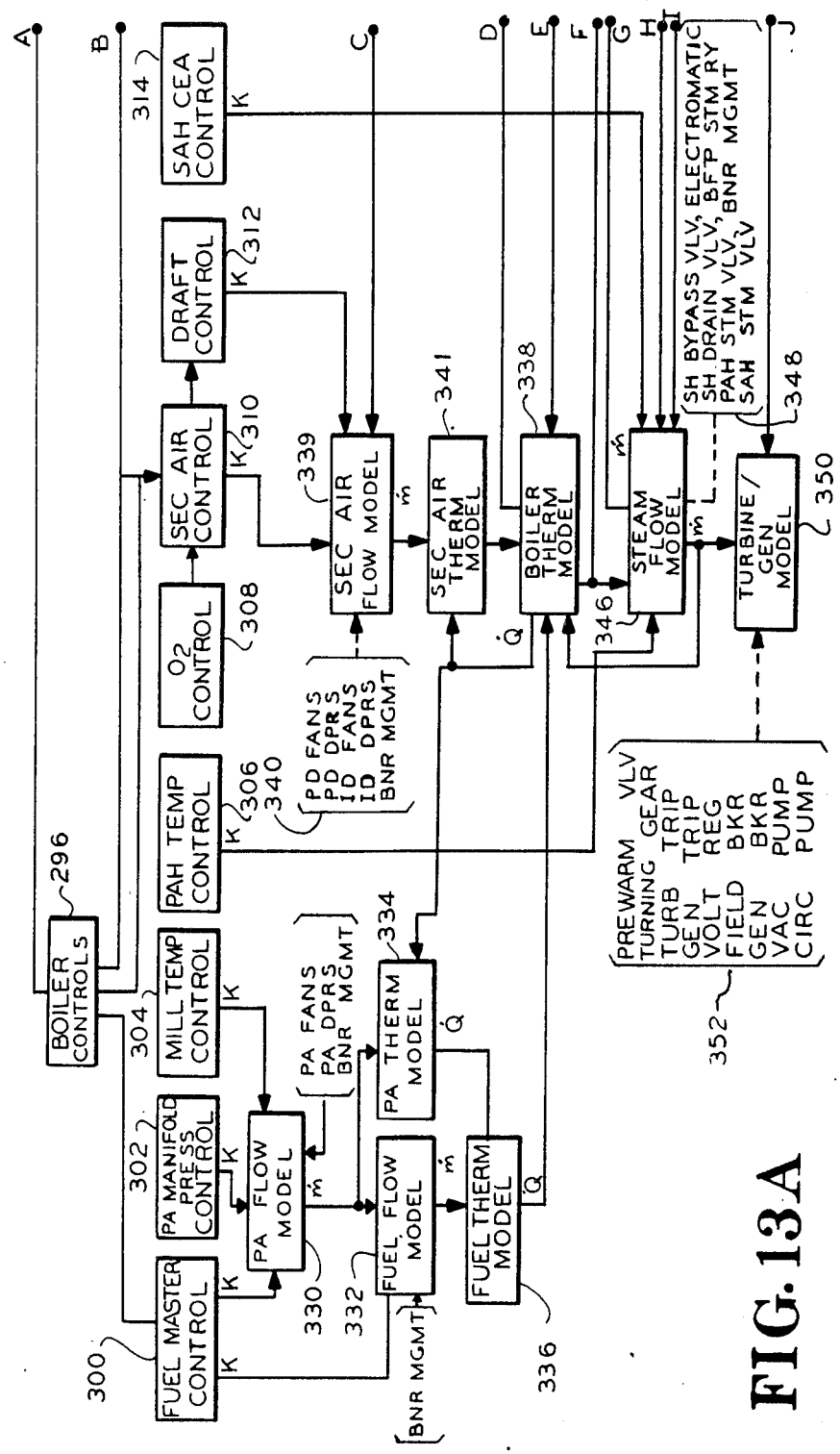
FIGS. 13A and 13B represents a flow chart illustrating the programming associated with the block diagram of FIG. 12.
Figure 13B:
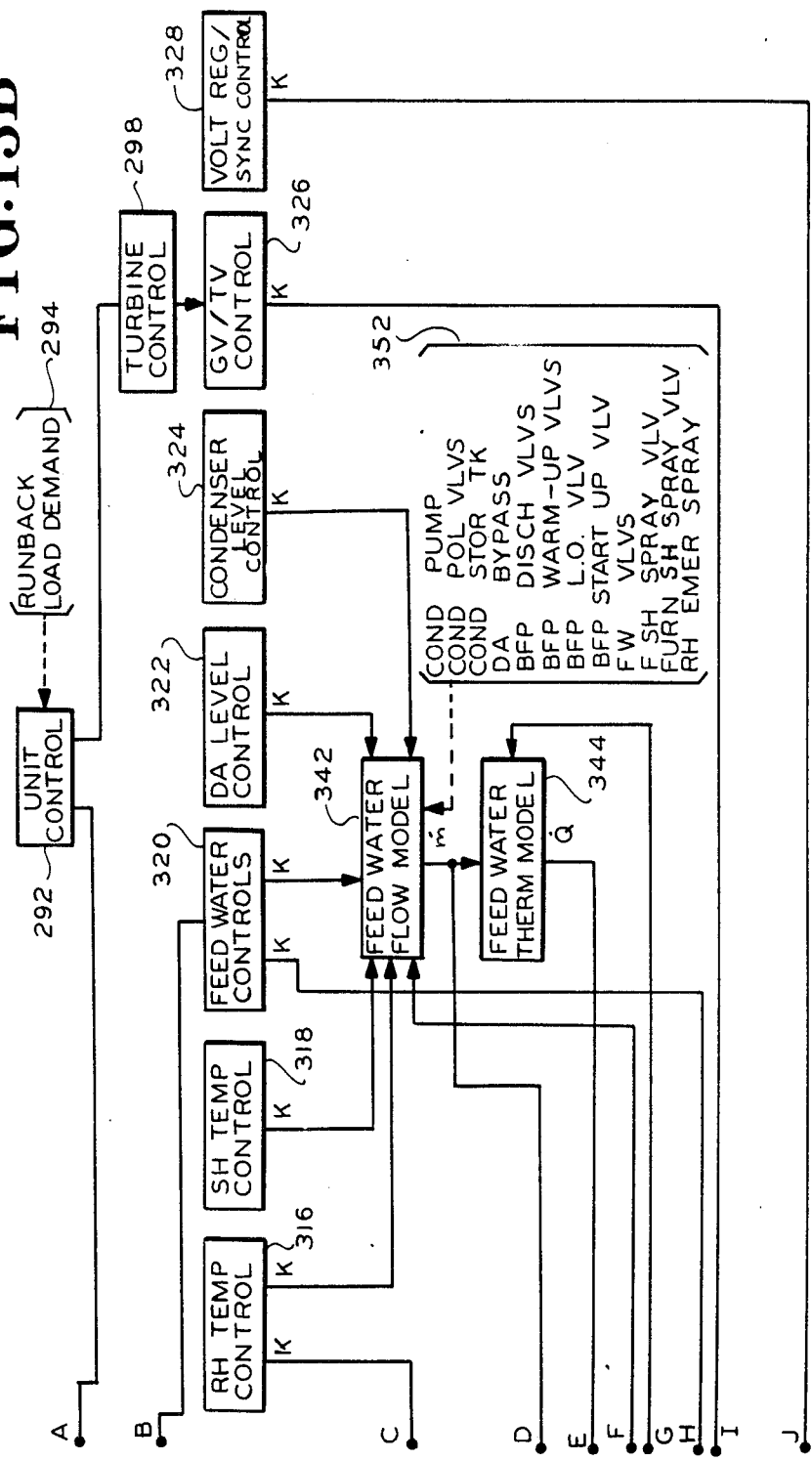

Referring to FIGS. 13A and 13B, a software block diagram is illustrated which illustrates the effects between the control, analog and digital blocks previously mentioned in connection with FIG. 12. The first three levels of control blocks are analog controls. Unit control block 292 on the first level, receives demand data from the operator or otherwise for commanding the desired power output of a generator. Another input to unit control 292 is the actual power output to allow formation of an overall closed loop around the system of FIG. 13. The unit control block 292 also interacts with digital control inputs. In particular the unit control interacts with runback and load demand interlocks 294 produced by the digital control blocks 268 (FIG. 12). On the second level the analog control blocks are shown segregated between boiler controls 296 and turbine controls 298. Boiler and turbine controls 296 and 298 on the second level of the software block diagram interact with the fifteen analog control blocks 300-328 on the third level. The balance of the blocks below the third level are primarily modeling blocks shown interacting with the digital control blocks 268 (FIG. 12) whose inputs to FIGS. 13A and 13B are illustrated as dotted lines.

Block 330 for modeling the flow of primary air has three coefficient inputs. These three coefficient inputs from analog control blocks 300, 302 and 304 are essentially demand values (for example 0-100% of a damper position). In this embodiment the primary air flow model 330 receives as an input a demand from the fuel master control blocks 300 since the fuel demand will affect the amount of combustion air drawn. Another input to block 330 is the manifold pressure demand signal from control blocks 302. This control signal sets the dampers associated with the primary fan air system to establish a given pressure at those dampers. Another demand input for setting the flow coefficient is the demand from the mill tempering control blocks 304. As will be apparent from the schematic of FIGS. 10A and 10B, the primary air can be delivered to the pulverizer 164 either directly (tempering) or through trisector airheater TR. The latter affects the air flow and the output of blocks 304 is therefore applied as an input to primary air flow model block 330. Shown as digital inputs 331 into blocks 330 are indications as to whether the primary air fans are operable and whether certain primary air dampers are in the proper position. Also shown as inputs are various digital signals classified as burner management signals. These represent a whole class of signals associated with the various valves, dampers and other controllable elements of the burner system. These digital signals associated with the primary air flow model must be in an acceptable status for the model to continue operating normally without setting an alarm.

primary air flow model 330 is concerned primarily with deriving an air mass flow which is delivered as an input to fuel flow model blocks 332 and primary air thermal model blocks 334. Fuel flow model blocks 332 also receive as an input a master demand signal from fuel master control blocks 300, since this factor relates to setting valves for establishing the total mass of fuel flow. The mass flow rate of blocks 332 is provided to the fuel thermal model 336. Fuel thermal model blocks 336 employ various known equations to determine a heat flow rate which is applied to boiler thermal model blocks 338 discussed further hereinafter. The heat rate of blocks 336 is modified by the heat rate calculated in the primary air thermal model 334. Model blocks 334 work with a heat flow term (useful for trisector simulation) derived from the boiler thermal model 338 which together with the mass flow rate developed by model blocks 330 allows the calculation of a heat flow rate.

Control blocks 308 are associated with the oxygen analyzer (a transducer sampling exhaust gas) and provide an error signal to blocks 310 which are concerned with deriving signals for controlling the secondary air system. The seconday air control blocks 310 provide a secondary air flow signal to the draft control blocks 312. Draft control blocks 312 provide output signals for controlling the dampers associated with the induced draft. The foregoing outputs from blocks 310 and 312 are inputs to the secondary air flow model blocks 339 which also have as an input, a reheater damper control signal from blocks 316 described hereinafter. Secondary air flow model blocks 339 also have as inputs 340 digital control signals signifying the status of forced and induced draft fans and dampers as well as burner management signals, the latter being the aforementioned class of signals associated with the status of various burner parameters. Secondary air flow model blocks 339 require that the various digital inputs 340 be in a proper condition for the mode in which the secondary air system is operating.

The result of the secondary air flow model calculation is a mass flow rate which is applied to secondary air thermal model blocks 341 which also have as an input the heat rate signal fedback from previously mentioned boiler thermal model blocks 338. Boiler thermal model blocks 338 also have as an input a feedwater mass flow rate derived from feedwater flow model blocks 342. Another input to boiler thermal model blocks 338 is the heat rate derived from feedwater thermal model blocks 344, as well as a steam mass flow rate derived from steam flow model blocks 346. Boiler thermal model blocks 338 calculate a steam pressure which is applied as an input to steam flow model blocks 346. That input together with a control variable from primary air, temperature control blocks 306 (associated with the steam coil airheater of the primary airheater) is applied to blocks 346. Other inputs to the steam flow model blocks 346 are the control variables for the steam coil air heater of the secondary airheater associated with blocks 314 and the variables from feedwater control blocks 320 associated with the steam demanded by the boiler feed pump. Another input to blocks 346 is the demanded settings of the governor and/or throttle valves from control blocks 326. Furthermore, digital inputs 348 allow checking of certain conditions associated with the superheater bypass valves, superheater drain valves, primary and secondary airheater steam valves, electromatic valve, boiler feed pump steam valve and burner management system. The output from steam model blocks 346 are two mass flow rates, one provided as an input to the feedwater thermal model blocks 344, another provided as common inputs to the boiler thermal model blocks 338 and to the turbine generator model blocks 350.

Additional inputs to the feedwater flow model blocks 342 are control signals from reheater temperature control block 316, associated with introducing spray water into the reheater to moderate its temperature. Another input to blocks 342 is the control signal from superheater temperature control blocks 318, another signal for controlling a spray to moderate temperature. A significant input to feedwater flow model blocks 342 is a demand signal for controlling the boiler feed pump from feedwater control blocks 320. A demand to set a given deaerator water level is also applied to block 342 from deaerator level control blocks 322. Additionally, a level control signal is applied to blocks 342 from the condenser level control blocks 324. Further digital inputs 353 to blocks 342 require for normal operation that the following elements be in the proper condition condenser pump, condensate polisher valves, condensate storage tank, deaerator bypass valve, boiler feed pump discharge valves, boiler feed pump warmup valves, boiler feed pump L.O. valve, boiler feed pump startup valve, feedwater valve, furnace superheater spray valve, furnace superheater spray valves and the reheater emergency spray valve.

Turbine/generator model blocks 350 have as an input the output of blocks 346 and the control signals for controlling the voltage regulator and synchronization controls, from control control blocks 328. Also digital inputs 352 to blocks 350 establish certain conditions which must be satified and which are associated with the condition of the prewarm valve, turning gear, turbine trip, generator trip, voltage regulator, field breaker, generator breaker, vacuum pump and circulating pump. The turbine/generator model blocks 350 calculate the resultant power output from the generator. This power output is used as a feedback signal which is applied to the unit control 292, as previously mentioned. Thus, the system forms a closed feedback loop.

Figure 14:
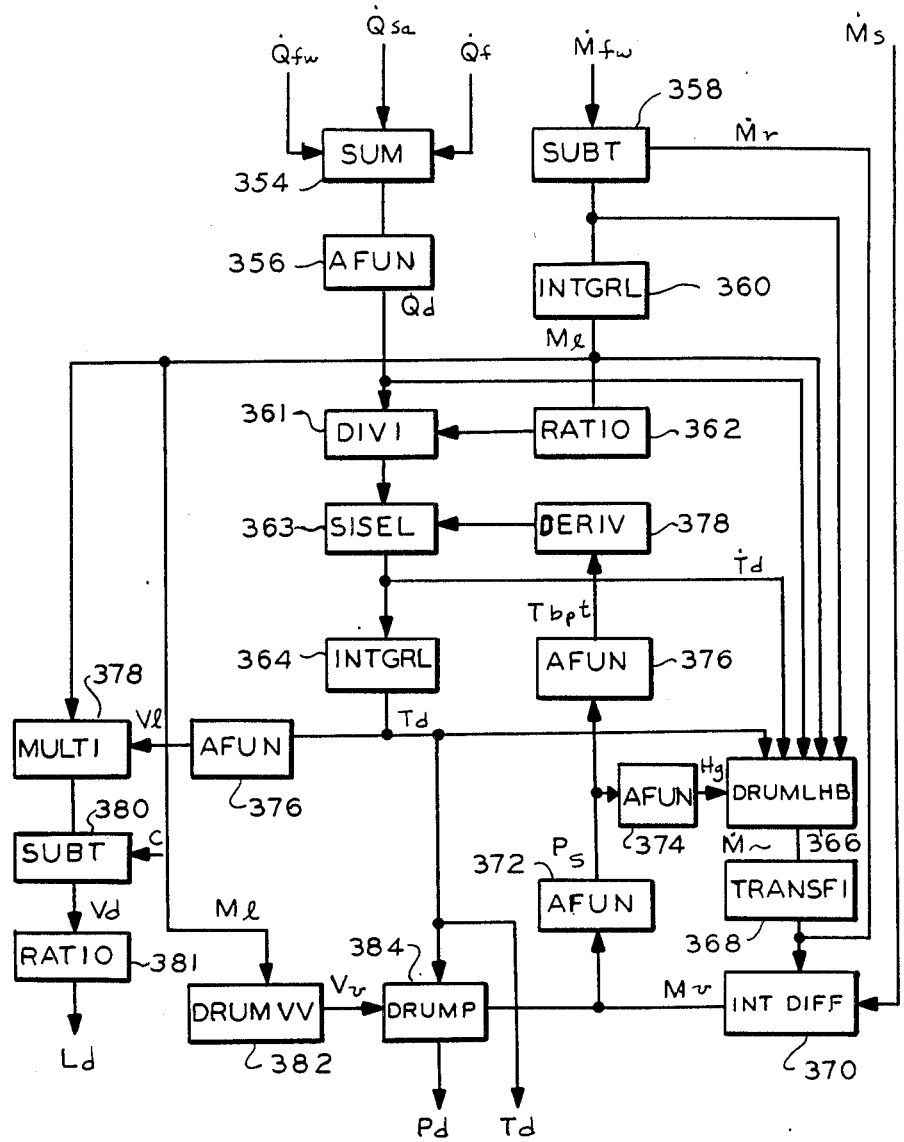
FIG. 14 is a flow chart showing in further detail some of the operations of the flow chart of FIG. 13.

Referring to FIG. 14, a more detailed block diagram is given of the boiler thermal model 338, previously illustrated in FIG. 13. It will be appreciated that the various other model blocks of FIG. 13 may have a similar level of complexity to accurately simulate the relevant plant. FIG. 14 essentially shows diagrammatically the various programming steps associated with the boiler thermal model block 338. The summing block 354 sums the heat rates of the feedwater, secondary air and fuel to provide an input to a function generator block 356. Function generator 356 is a transfer function according to a piecewise linear function. The thus transformed output has been corrected for certain nonlinearities and corresponds to the heat input rate to the drum of the boiler BLR (FIG. 10A). The mass flow rate of the feedwater is subtracted in programming block 358 with an input (whose derivation is described hereinafter) relating to the mass flow rate of the vapor. The difference from block 358 is the net liquid flow rate which is integrated in block 360 to derive the mass of the liquid. This mass is subjected to a constant proportionality factor in block 362 to provide to dividing block 361 a corrected divisor indicating the mass of the liquid. Since the dividend input of block 361 is the heat rate from block 356, the output of divider block 361 is a ratio of the drum input heat rate to the mass of the liquid in the drum DR (FIG. 10A). It will be appreciated that this ratio is related to the rate of change of temperature of the drum liquid and is used to model this variable before boiling occurs. Thus, the output of dividing block 361 is provided as one of the selectable inputs to signal selector block 362. The selected output from selector block 362 is applied to an intergrator 364 to integrate the temperature rate to produce the drum temperature as an output. This drum temperature is applied as an input to block 366 which is used to calculate a liquid heat balance in the drum. The equations of block 366 are conventional thermodynamic equations. Block 366 receives as an input not only the aforementioned temperature but also the temperature rate output from block 363. Also applied as input variables to block 366 are the outputs of blocks 356, 360 and 358, variables associated with the rate of change of heat in the drum, the mass of liquid in the drum and the net rate of change of liquid mass in the drum, respectively. Since the latent heat $H_g$ (derived in a manner described hereinafter) is also an input to block 366, it can provide as an output a factor related to the rate of production of vapor. This output is corrected by transfer function block 368, a first order lag necessary to properly characterize the expected time lag inherent in the actual plant. This lagging output is then applied as an input to subtractor block 358. This lagging output variable is also netted with the mass flow rate of the ougoing steam (derived in a separate block) and integrated to provide as an output from block 370 the mass of the vapor. By assuming a given volume, this vapor mass may be subjected to a piecewise linear transfer function in block 372 to provide a variable relating to the pressure of the steam. This steam pressure is also subjected to another piecewise linear transfer function in block 374 to derive the latent heat $H_g$, previously mentioned as an input to block 366. The steam pressure output of block 372 is also subjected to another piecewise linear function in block 376 to produce a variable $T_{bpt}$ corresponding to the boiling point temperature of the liquid. This variable is differentiated in block 378 to produce the second temperature rate signal which can be selected by block 363.

Thus the signal select block obtains the rate of change of the temperature of the liquid either from a preboiling calculation emanating from block 361 or a postboiling calculation emanating from block 378. The drum temperature output from block 364 is also subjected to another piecewise linear transfer function in block 376 to produce as an output the specific volume of the liquid which is then applied as an input to multiplier block 378 whose other input is the liquid mass output from block 360. This multiplied output is corrected by a constant in subtractor block 380 to produce as an output the volume of liquid in the drum. By multiplying the foregoing by an appropriate constant in block 381 the liquid level of the drum is derived as an output therefrom.

The mass of the liquid, the output from block 360, is applied as an input to block 382 which calculates therefrom the volume for the liquid, the balance assumedly being the vapor volume. This vapor volume output is applied as an input to block 384, which also has as inputs the drum temperature and vapor mass (outputs of blocks 363 and 370, respectively). With these three variables block 384 calculates in the conventional manner the drum pressure.

Figure 15:
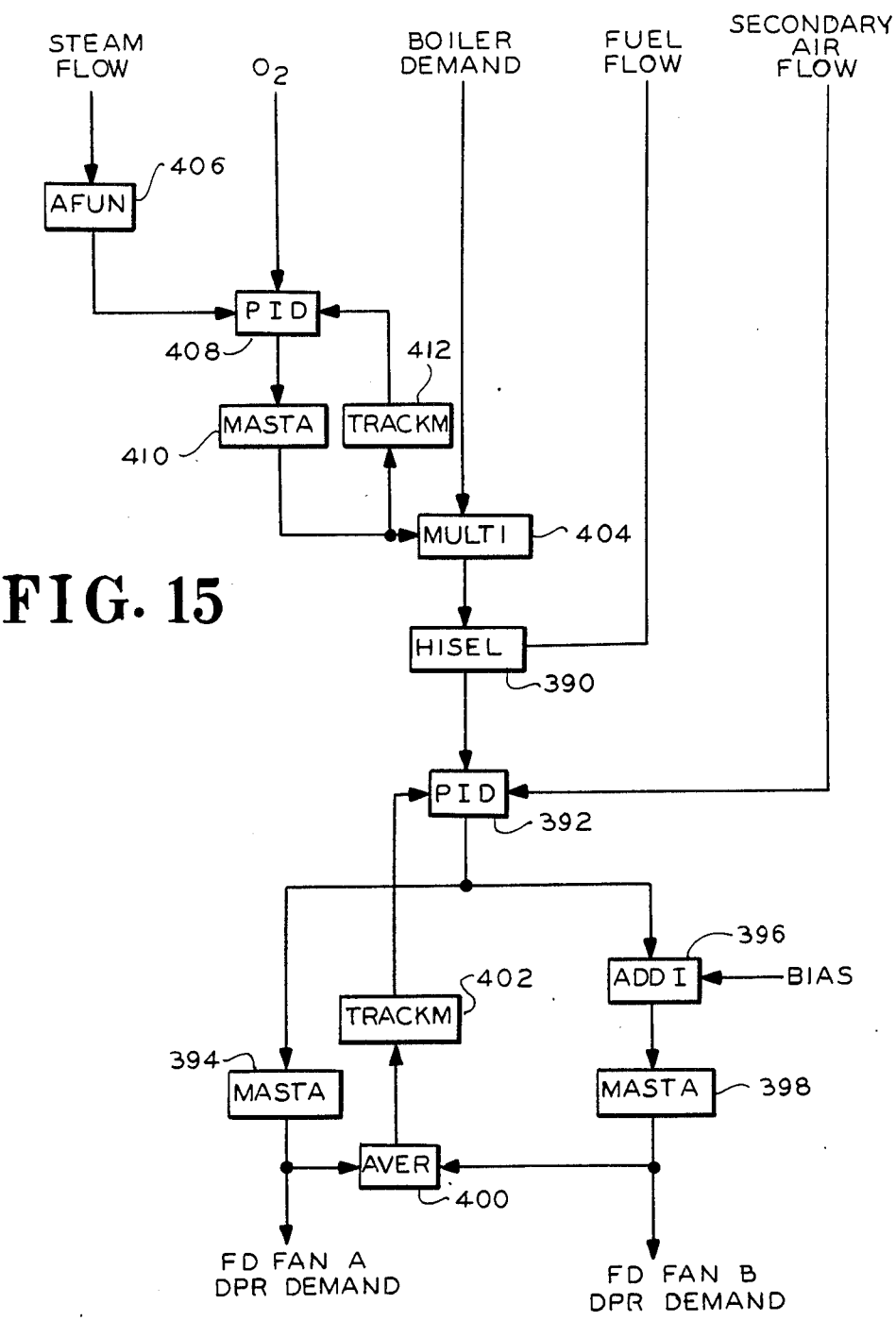
FIG. 15 is another flow chart showing in further detail a portion of the operation of the flow chart of FIG. 13.

Referring to FIG. 15, a more detailed illustration is given of blocks 308 and 310 of FIG. 13. While the specific control function described herein is a typical control loop, other control techniques may be used as is known in the industry.

Block 390 selects the higher of its two inputs as a set point variable. For example, assume the fuel flow input to block 390 is the higher. This input will then be selected since an excessive fuel flow rate must be compensated to allow complete combustion of the fuel. This selected input is provided as a set point to block 392 which compares that input to the secondary airflow input, derived from the secondary airflow model (block 339 of FIG. 13). These two signals are subtracted to provide an error signal which may be integrated and coupled through block 394 to provide a control signal to control the damper associated with forced draft fan A. In automatic mode, block 394 couples the automatic control signal of block 392 through without modification or, in the manual mode, blocks it and substitutes therefore a manually controllable signal. These operations may be performed with the panel of FIG. 6E. The output of block 392 is also coupled through an adder block 396 which has an input for manually biasing this signal in the event the operator wishes to bias the control. Another manual/automatic station block 398 allows, in a manner similar to block 394, the coupling or blocking of the output of block 396 to provide an output for the damper associated with forced draft fan B. The two output signals of blocks 394 and 398 are averaged in block 400 and coupled back through a tracking block 402 to another input of differential integrating block 392. Block 402 operates in the manual mode to adjust the integrating function of block 392 so that the output of block 392 matches the manually commanded signal. Thus, when the system is transferred to the automatic mode there are no transients due to a difference between the integrated demand output of block 392 and the condition of the dampers as previously commanded during a manual mode sequence.

When the fuel flow is not excessive the selecting block 390 selects the output of block 404 which has as one input the boiler demand signal. Thus, a part of this control path acts to adjust the dampers in response to changes in boiler demand. The boiler demand is used as a setpoint against which secondary airflow is adjusted. Multiplier block 404 is provided to allow trimming of the boiler demand value in response to the excess oxygen functions as follows. The steam flow derived from the foregoing models is provided as an input to function generator 406. This function generator 406 provides a tailored characteristic for correlating excess air to steam flow. The object is to allow higher excess air when the load, as evidenced by the steam flow, is light. In this fashion, excess air is compared against the output of block 406 in differential integrater 408 to provide an integrated error signal. This error signal can be coupled in the automatic mode through block 410 to provide an excess oxygen trim signal to multiplier 404 as previously mentioned. Block 410 cooperates with block 412 to provide the same "bumpless" transfer from manual to automatic mode that was provided by previously mentioned block 402.

To facilitate an understanding of the principles associated with the foregoing apparatus, its operation will be briefly described. In this description many of the manual controls and instruments described can be identified by reference to Table I which provides an index indicating positions on consoles 10 and 14. The following describes a cold start-up procedure under normal conditions. The descriptions assumes that the plant has been shutdown for one week or more and that the turbine first-stage shell temperature is less than 300° F. It also assumes that the boiler, deaerator, condenser hotwell and condensate storage tank are empty.

An instructor can initially establish operating conditions by inserting a cassette containing the simulator program into tape drive 34 (FIG. 2) to read the basic program into computer memory. The instructor may also employ terminal 32 to recall certain initial conditions. The student commences a cold startup procedure by operating the appropriate controls on the console C to simulate placement of the turbines on the turning gear TG (FIG. 10B) and also placement of the oil pump associated with the turbines HP, Ip and Lp in service. Computer 28 (FIG. 11) responds to the manual control actuated by the student to store the various facts which may be used in certain digital interlocks and in various control and modeling functions. Next the student operates controls on console C signifying an opening of the valve for filling the condensate storage tank 202 (FIG. 10B). This factor is applied to feedwater flow model block 342 (FIG. 13) to start simulation of the filling of condensate storage tank 202. Essentially, a constant associated with the period of the valve opening is integrated to provide a ramping signal. This ramping signal is displayed at a meter on console C to indicate the level of condensate in the storage tank 202. The student may close the valve associated with tank 202 when the indicated level is proper. In a similar fashion the student may operate valves leading from the tank 202 to the condenser CND thereby changing the liquid level in condenser CND which will be similarly be displayed to the student.

The student will next operate various controls on console C to advise computer 28 that certain valves and controls necessary to fill the boiler are being placed into an appropriate condition. One such control operated by the student indicates starting of condensate pump 204 (FIG. 10B). This simulated flow is from pump 204 through valves 218 and 220 to feedwater line FW. By appropriately regulating simulated valve 220 by manual controls on console C, the student can feed data to computer 28 which uses the foregoing information to calculate an increases in the liquid level of boiler drum DR (FIG. 10A).

To establish combustion air the student starts the trisector TR and its oil pumps and sets various simulated dampers by operating associated controls on console C. Using simulated auxiliary steam supply AUX (FIG. 10B) the student sets controls on console C to alert computer 28 to the induction of auxiliary steam into the steam coils upstream of trisector airheater TR. An automatic control in console C is next adjusted to establish a trisector setpoint of 185° F., cold end temperature. The student will now manipulate controls on console C to advise computer 28 of the opening of various dampers and the starting of fans for induced draft in duct ID and for forced draft in duct SA. The modeling blocks respond to the commanded position of the various dampers and the starting of the fans to calculate the associated air flows.

Since many of the indications on console C relate only to one of several mills, selector switch 56 should be placed in a position to indicating which one of the several mills will be affected first. Once selector switch 56 is placed into the appropriate position, indicators and controls in insert panels F4 and F5 relate only to that selected mill. It will be noted however, that certain indicators are dedicated to one of the several mills, especially those in groups A5, B5, C5 and D5.

The student will now operate the controls in console C to satisfy the purge permissive indicators in array 90 of FIG. 8. The nature of these indicators has been previously discussed in connection with this Figure. Basically, various dampers, fans and other elements must be operated and certain parameters must reach acceptable values before a purge may be started, by depressing a manual start switch in array 90. Computer 28, once it verifies that all purge permissives have been satisfied and after receiving a purge-start command, commences a timing cycle. The computer displays the elapsed time on display 96 (FIG. 8). The model blocks are used to calculate the associated airflows during the purge interval. Should any of the permissives fail during this period (for example, should the student improperly operate an inappropriate control) the purge will be interrupted and computer 28 will forward an interrupt signal to be display on array 90. While the purge is in progress the student can operate controls on console C to simulate extension of the furnace temperature probe into the boiler BLR (FIG. 10A) and actuation of the soot blowers of trisector airheater TR. The student will also verify that all of the valves associated with emergency spraying of liquid into superheaters SH1, SH2 and SH3 are closed (FIG. 10A).

The student may now reset the master fuel trip relay button in array 90. Various permissive indicators in arrays 90 and 92 may be observed to confirm whether the purge is complete, whether a master fuel trip (MFT) condition is present and whether tertiary air fans are running. The foregoing must be in a satisfactory condition before the MFT relay will be indicated by computer 28 as reset. After resetting of the MFT relay computer 28 commences a ten minute delay period during which ignition of the igniters in burners 168 (FIG. 10A) must occur.

Next the student operates controls on console C to start fuel pump 176 (FIG. 10A). The student will also command the opening of the igniter oil trip valve open by operating a corresponding switch in array 92. If these prelight conditions are satisfactory computer 28 indicates the igniter fuel trip (IFT) relay is reset as well as the MFT relay and signals by an appropriate indication in array 92 that permission to light igniters is given. Certain igniter permisssives must be verified which the student can do through arrays 80A and 80B wherein the computer signals whether there is already an igniter flame, whether igniter shutoff valves are closed, whether igniters are coupled, whether burner shutoff dampers are closed and whether the air registers are in a lighting position. Once these conditions are satisfied the student can signal to the computer a request to start the igniters by depressing the igniter start switch in array 89 (FIG. 7). The computer will now simulate through the indicators on console C the extension of igniters into the furnace and opening of igniter oil valves and will illuminate a "igniter flame" indicator. This simulated ignition allows heat to be calculated by the modeling blocks within the system. Accordingly, the heat flow model illustrated in FIG. 13 commences to calculate temperature changes, pressure changes, etc.

The student will now operate valve controls on console C to place low pressure heater 210 (FIG. 10B) in line. By also operating a valve control on console C indicating the opening of a valve between heater 210 and deaerater DA, the computer 28 concludes the deaerater DA is being filled. The computer, operating with a controlled fill rate, to arrive by integration at a deaerater level which is displayed on appropriate instruments on console C. The student may set the deaerator system into automatic by depressing the appropriate auto/manual switch (for example, switch 74 of FIG. 6E), causing computer 28 to establish a preprogrammed set point. Consequently, the computer regulates the simulated valve feeding deaerator DA to establish a desired deaerator water level. The student may also simulate starting of condenser circulating water pump 200 (FIG. 10B) as well as induction of auxiliary steam from supply AUX to deaerator DA by operating the appropriate controls on console C. The heat added during deaeration is employed by the thermal modeling blocks to simulate a heat flow within the system.

Other manual controls on console C can be operated to indicate to computer 28 that gland sealing steam has been applied to turbines HP, IP and LP as well as boiler feed pump turbine 14. Similarly, various oil pumps and vacuum pumps may be started. The student may simulate warming up of the boiler feed pump turbine 214 by opening valves from deaerater DA to pump 212 and by opening warm up valve WU to establish a closed circulation between deaerator DA and condenser CND. The modeling blocks of the computer 28 calculate and display various temperature changes caused by the foregoing changed circumstances. Turbine 214 of boiler feed pump BFP can be started by signalling opening of the recirculation valve RC and admission of steam to turbine 214 by setting the appropriate controls on console C. This establishes new flow conditions which, of course, establishes new operating parameter changes requiring recalculation of the value established by modeling blocks in computer 28.

Next the student signals passage of water from boiler feed pump BFP to boiler BLR by operating controls signaling the closing of warmup valve WU and the opening of startup valve SU. When stable conditions are achieved the student simulates feedwater flow through deaerator DA by commanding the closing of valves 220 and 218. After signaling the typical controls for starting and regulating the operation of turbine 214 and boiler feed pump BFP the student eventually signals to computer 28 a shift of control from startup valve SU to main discharge valve 216.

The student may now issue signals from console C to allow simulated boiler pressurization and to place heaters HP1 and HP2 as well as heater 210 into the system. Various manual controls are now operated to advise the computer to establish various venting, draining and mass blow down conditions in boiler BLR. As steam pressure rises gland steam seals can be switched from auxiliary to local steam on line MS (FIG. 10A). Various other valves for providing additional superheating temperature and to remove condensate from superheaters can be similarly operated by the student. The student may also simulate admission of steam from line MS to the turbines HP, IP, and LP to allow a sixty minute warmup soak. Also, at this time the student can operate manual controls to signal the computer to start primary air fan 178 (FIG. 10A) and to regulate various dampers associated therewith. The computer models various parameters associated with fan 178 and its dampers to display pressure signals at points in the system on console C. The student may request automatic control of the primary air system which will cause a control block in computer 28 to automatically regulate the associated dampers.

Before attempting to light coal, the student must observe various displays on console C to verify that the MFT relay is reset, the permission to light igniters still exists, the primary air fan is running, the primary air fan discharge damper is open, primary air duct pressure is normal and at least one air preheater is running with its damper open. These permissives are indicated in array 94 of the fuel safety insert panel of FIG. 8. When the permissives are satisfied, the permission to light coal indicator will be illuminated by computer 28 and displayed in array 94 of FIG. 8.

The student will now examine certain calculated values displayed by computer 28 on console C to verify that the simulated pulverizer has appropriate current levels, differential pressure levels and coal/air temperatures. The student will now operate controls on console C to set dampers associated with mill 164 and ducts 166, 182, 184, 186 and 188 (FIG. 10A). These dampers may be adjusted manually or placed in an automatic mode in a manner similar to the operations previously described for other automatic operations. The student will also operate controls on console C to operate simulated fans to cool burner tips and to start a simulated oil pump associated with pulverizer 164. Once these various preconditions are met, permissive lights on panel array 89 and elsewhere will illuminate.

A pulverizer ready light on array 89 will illuminate next indicating the computer will allow the student to start the pulverizer. Accordingly, the student depresses a pulverizer running switch in array 89. After a delay period which may be required to sweep a mill a feeder ready light will illuminate in array 89 signaling the computer will allow simulated feeding of coal from bin 160 (FIG. 10A) through feeder 162 to pulverizer 164. The student may operate a pulverizer running switch in array 89 causing the computer calculate a coal rate and to make appropriate adjustments to the various modeling equations. The student may now also adjust various dampers associated with the pulverizer 164 and place the air registers 168 into an appropriate condition. Furthermore, the student may set the mill temperature to an automatically regulated temperature which will be automatically controlled by computer 28 by regulating various dampers associated with mill 164.

Once the temperature and pressure in boiler BLR reaches calculated values indicating a high loading capabililty the student may operate the controls on console C to effectively eliminate the igniter operation and eventually shutdown oil pump 176 (FIG. 10A).

The student may now commence a turbine roll and synchronization by operating the controls illustrated in FIG. 9. For example, the student may select an auto turbine mode by depressing switch 144. The student may set a speed target with the switches in group 132 and may also select one of the three acceleration rates in group 134. In response, the computer will automatically regulate the simulated valves TV and GV (FIG. 10B) and display a calculated value for their setting. Computer 28 will also signal a release of turning gear TG (FIG. 10B). The various control blocks of computer 28 will regulate the turbines to produce a preprogrammed rate of increase in turbine speed to establish a gradual temperature soak of the turbines.

Once the turbines HP, IP and LP reach a 3000 RPM soak the student can transfer control to the governor valve GV by manipulating switches 136 and 140 (FIG. 9). Eventually, the throttle valve TV will be placed into a 100% open condition. Thereafter, the student will operate the 3600 RPM switch in array 132 to bring the turbines up to full speed.

Various breakers, voltage regulator controls and syncroscope controls are operated on panel A1 of FIG. 9 to prepare the system for switching onto the utility lines. The student can, under manual control, simultaneously adjust the knobs 154 and 156 the syncroscope 54 (FIG. 5) to the "12 o'clock" position while keeping the generator voltage at 24 KV. Various other controls may be operated by the student to simulate a 5% generator load and to adjust various economizer reheat lines.

In this fashion generator G can be caused to gradually increase its simulated power output. This power change can be performed in an automatic manner by setting a demand on meter 124 through the demand set switches 126 (FIG. 9). The demand setting may be compared to the actual load value displayed on display 122 from computer 28. The various parameters for changing power can be conveyed to the computer control blocks by manual controls 108, 110 and 116. These basic operations may be conducted in a base mode by selecting the appropriate switch among array 118.

The system of FIG. 13 can operate under three basic modes: boiler follow, turbine follow and coordinated (local and remote). These modes may be selected by depressing the appropriate switch among array 118 of FIG. 9. The control and modeling blocks of FIG. 13 are advised therefore, to control the system in accordance with the selected mode. In the boiler follow mode, computer 28 has a control loop whereby the boiler rate (the heat being generated within the boiler) is adjusted to control the pressure at throttle TV (FIG. 10B). This throttle pressure can be held to a "variable" or "contant" pressure depending upon the actuation of switches 120 (FIG. 9). Thus, the computer 28 will adjust the fuel and air flow into the burner of boiler BLR to regulate the throttle pressure to a desired value. The generator output is regulated by the voltage regulator and exciter associated therewith in a conventional fashion.

In the turbine follow mode the above mentioned boiler rate is adjusted to produce a desired power output from the generator G. In this mode the throttle valve TV is then regulated to provide a desired throttle pressure.

There are two coordinated modes local and remote. The remote coordinated mode indicates a power demand transmitted by an instructor through module 32 (FIG. 1). The local coordinated mode simply means that the power output of generator G is as set by load demand setting 124, 126 (FIG. 9). In either event computer 28 regulates the throttle valve TV and the controls asssociated with generator G in a coordinated fashion. The throttle valve will be adjusted as a function both of the throttle pressure error and the power output error. Similarly, the boiler rate will also be adjusted as a function of the throttle pressure and the power output error. The two equations used by computer 28 to control throttle valve TV and generator G are different. Both however, are in the form of linear equations including integration functions that derive control values for the throttle valve and generator control.

It will be appreciated that the foregoing sequence of operations can be interrupted by the instructor issuing a fault instruction through hand held module 32 (FIG. 1). Any one of the faults listed in Tables IIA or IIB may be issued. For example, the instructor can issue a command to improperly close one of the dampers associated with the primary airheater. Consequently, the computer will note the improper closure and signal an appropriate annunciator alarm on the console C. In addition, the modeling blocks of computer 28 will note the change in the air flow resulting from the improper damper closure. In response the change in air rates will be applied to the programmed models to recalculate the various temperature, flow rate and heat exchange rates. The resulting change in these values may result in additional alarms such as an excessive temperature alarm, insufficient oxygen alarm, etc.

It is to be appreciated that various modifications may be implemented with respect to the above described preferred embodiments. For example, while a utility power generating plant has been described herein, the simulator system can be adapted to simulate various other industrial plants. Furthermore, the number of devices and control simulated can be increased or decreased depending upon the level of detail to which the student must be instructed. Also, the computer program necessary to simulate the relevant industrial plant can be fabricated using various programming steps which may be reordered, supplemented and modified in various ways to satisfy the needs of the particular computer chosen. Also, the type of switches and meters employed can be varied depending upon the type of system which is to be simulated. Also the number, type and quality of the components used can be altered to satisfy the desired speed, accuracy, data handling capacity, etc.

Obviously, many modifications and variations of the present invention are possible in light of the above teachings. It is, therefore, to be understood that within the scope of the appended claims, the invention may be practiced otherwise than as specifically described.

What is claimed is:

1. A simulator for simulating a multi-stage industrial plant controllable by a digital control and digital programmer for affecting plant operation, comprising:
   a simulation console;
   a plurality of indicators mounted on said console for producing an indication in response to display signals applied thereto;
   a plurality of manually operable controls mounted on said console for producing manual signals;
   programmable means coupled to said indicators for providing to them said display signals, said programmable means being coupled to said manually operable controls for receiving their manual signals, said programmable means including:

model means responsive to the manual signals of predetermined ones of said manually operable controls for providing a programmed array of processed values sized to simulate parameters existing during operation of said industrial plant, given ones of said array of values being applied to specified ones of said indicators for providing said indication; and control means responsive to programmed ones of said array of values for modifying said array to an extent and in a manner determined by programming of said programmable means, said simulator further comprising:

digital programming means constructed the same as said digital programmer for affecting the programming of said programmable means to alter the operation of said control means.

2. A simulator according to claim 1 further comprising:

a schematic panel detachably secured to said console at a position to allow removal without interfering with said indicators and said manually operable controls, said schematic panel illustrating said industrial plant.

3. A simulator according to claim 2 further comprising:

a plurality of replacement and additional indicating devices; and a plurality of replacement and additional manually operable devices, said indicating and manually operable devices being mountable in said console and connectable to said programmable means to exchange data therewith.

4. A simulator according to claim 3 wherein said plant has at least one stage having a plurality of similar substages, said manually operable controls including:

at least one selector associated with a corresponding group of indicators, said group of indicators being driven by said programmable means to display operating parameters of a selected one of said plurality of similar substages, selection of one of said similar substages for said group being controlled by said selector.

5. A simulator according to claim 4 wherein said console comprises:

a cabinet; and a table-type leaf hingeably mounted to the front of said cabinet to fold into it flush.

6. A simulator according to claim 1 wherein said programmable means comprises:

a main terminal coupled to said programmable means for displaying its messages and for giving it one of a plurality of program-affecting instructions; and a remote, portable, terminal coupled to said programmable means for displaying its messages and for giving it one of a plurality of program-affecting instructions, and said portable terminal being operable to alter said array of values to simulate a faulty condition.

7. A simulator according to claim 6 wherein said digital programming means comprises:

a first switch means for issuing an instruction to store an indexed count;

a second switch means for issuing an instruction to change said indexed count; and a third switch means for issuing an instruction to compare said indexed count to a programmed value.

8. A simulator according to claim 7 wherein said digital programming means comprises:

a fourth switch means for issuing an instruction to commence timing for a predetermined interval; and a fifth switch means for issuing an instruction to test if said predetermined interval has elapsed.

9. A simulator according to claim 6 wherein said indicators include a plurality of alarms, said programmable means being operable to actuate at least one of said alarms in response to one of said array of values exceeding a programmed limit.

10. A simulator according to claim 9 wherein said plant has a boiler fired by a burner and wherein said controls include:

a burner start switch for signifying a request by an operator to start said burner, said indicators including:

permissive indicators actuated by said programmable means in response to corresponding ones of said manually operable controls and said array of values satisfying programmed criteria; and a burner ready indicator actuated by said programmable means in response to all of said permissive indicators being actuated.

11. A simulator according to claim 10 wherein said manually operable controls include a purge start switch for signifying a request by an operator to purge said boiler, said permissive indicators comprising:

a plurality of purge precondition indicators, said purge precondition indicators being actuated by said programmable means in response to corresponding ones of said manually operable controls and said array of values satisfying programmmed criteria; and a purge complete indicator to be actuated by said programmable means after said purge precondition indicators have been actuated for a predetermined purge period, whereby said burner cannot be started until after said predetermined purge period.

12. A simulator according to claim 11 wherein said plant includes a turbine, a turbine throttle and a generator and wherein said indicators include throttle, throttle pressure, boiler rate, and megawatt indicators signifying throttle position, throttle output pressure, fuel/air consumption at said boiler, and power from said generator, respectively, said programmable means being operable in a boiler follow mode to adjust at least one of said array of values associated with said boiler rate indicator to hold said throttle pressure indicator at a selected pressure value, said programmable means also being operable in said boiler follow mode to adjust at least one of said array of values associated with said throttle indicator to hold said megawatt indicator at a selected power value.

13. A simulator according to claim 12 wherein said programmable means is operable in a turbine follow mode to adjust at least one of said array of values associated with said throttle indicator to hold said throttle pressure indicator at a given pressure value, said programmable means also being operable in said turbine follow mode to adjust at least one of said array of values associated with boiler rate indicator to hold said megawatt indicator at a given power value.

14. A simulator according to claim 13 wherein said programmable means is operable in a coordinated mode to adjust at least two of said array of values associated with said throttle indicator and boiler rate indicator, each as a function of said throttle pressure and megawatt indicator.

15. A simulator according to claim 1 wherein said programmable means includes a program having a plurality of blocks, each of a subset of said blocks containing physical equations applicable to modeling different portions of said plant in response to at least one of said array of values.

16. A simulator according to claim 15 wherein one of said subset of said blocks includes:
   means for calculating flow rate from a given pressure drop.

17. A simulator according to claim 16 wherein another one of said subset of said blocks includes:
   means for calculating fluid pressure in a pipe subjected to specified conditions.

18. A simulator according to claim 17 wherein another one of said subset of said blocks includes:
   means for calculating pump pressure from the energy balance around a pump.

19. A simulator according to claim 18 wherein another one of said subset of said blocks includes:
   means for calculating fluid temperature from heat and mass flow and specific heat.

20. A simulator according to claim 19 wherein another one of said subset of said blocks includes:
   means for calculating a thermal time constant from the ratio of the product of mass and specific heat of steel to the product of mass flow and specific heat of a fluid.

21. A simulator according to claim 20 wherein said plant includes a boiler having a drum and wherein another one of said blocks includes:
   means for calculating from specified parameters of said drum, its liquid heat balance, liquid level, pressure and vapor volume.

22. A simulator according to claim 21 wherein another one of said blocks includes:
   means for calculating condensation temperature from specific heat and a heat to mass ratio.

23. A simulator according to claim 22 wherein said boiler has a fuel burner supported by an air flow and wherein another one of said blocks includes:
   means for calculating fuel temperature from the temperatures and flow rates of the fuel and air and their specific heats.

24. A simulator according to claim 23 wherein said plant has at least one heat exchanger and wherein another one of said blocks includes:
   means for calculating an exchanger outlet temperature from inlet temperature, a specified heat transfer coefficient, the thermal conductivity of steel and a specified time constant.

25. A simulator according to claim 2 wherein said schematic panel illustrates either one of a natural circulation boiler or once-through boiler.

26. A simulator according to claim 25 wherein said schematic panel illustrates either one of a trisector airheater or a primary-secondary airheater.

27. A simulator according to claim 26 wherein said schematic panel illustrates either one of a roller-type pulverizer or ball mill pulverizer.

28. A simulator according to claim 2 wherein said schematic panel is mounted atop said console separate from said indicators and controls.

29. A simulator according to claim 28 wherein said console comprises:
   a cabinet; and
   a table-type leaf hingeably mounted to the front of said cabinet to fold into it flush.

30. A simulator according to claim 1 wherein said control means operates digitally and comprises:
   analog means responsive to corresponding ones of said manual signals and said array of values to calculate analog signals; and
   digital means responsive to corresponding ones of said manual signals and said array of values to calculate digital signals.

31. A simulator for simulating a multi-stage industrial plant, at least one stage having a plurality of similar substages, comprising:
   a simulation console;
   a plurality of indicators mounted on said console for producing an indication in response to display signals applied thereto;
   a plurality of manually operable controls mounted on said console for producing manual signals; and
   programmable means coupled to said indicators for providing to them said display signals, said programmable means being coupled to said manually operable controls for receiving their manual signals, said programmable means including:
   model means responsive to the manual signals of predetermined ones of said manually operable controls for providing a programmed array of processed values sized to simulate parameters existing during operation of said industrial plant, given ones of said array of values being applied to specified ones of said indicators for providing said indication; and
   control means responsive to programmed ones of said array of values for modifying said array to an extent and in a manner determined by programming of said programmable means, said manually operable controls including at last one selector associated with a corresponding group of indicators, said group of indicators being driven by said programmable means to display operating parameters of a selected one of said plurality of similar substages, selection of one of said similar substages for said group being controlled by said selector.

32. A simulator for simulating a multi-stage industrial plant having a plurality of controllable devices, comprising:
   a simulation console;
   a plurality of indicators mounted on said console for producing an indication in response to display signals applied thereto;
   a plurality of manually operable controls mounted on said console for producing manual signals; and
   programmable means coupled to said indicators for providing to them said display signals, said programmable means being coupled to said manually operable controls for receiving their manual signals, said programmable means including:
   model means responsive to the manual signals of predetermined ones of said manually operable controls for providing a programmed array of processed values sized to simulate parameters existing during operation of said industrial plant, given ones of said array of values being applied to specified ones of indicators for providing said indication;

controls means responsive to programmed ones of said arrary of values for modifying said array to an extent and in a manner determined by programming of said programmable means;

a main terminal coupled to said programmable means for displaying its messages and for giving it one of a plurality of program-affecting instructions; and a remote, portable, terminal coupled to said programmable means for displaying its messages and for giving it one of a plurality of program-affecting instructions, said portable terminal being operable to alter said array of values to simulate a faulty condition.

33. In a method employing a simulator for alternatively simulating any one of a plurality of industrial plants having a digital programmer, the simulator having a plurality of console-mounted, replaceable indicators and manual controls detachably connected to a computer, the method comprising the steps of:

replacing corresponding ones of said indicators and manual controls to allow simulation of a selected one of said industrial plants;

installing in said simulator a digital programmer constructed as the one in said plant;

changing the programming of said computer by operating said digital programmer of said simulator;

reprogramming said computer to provide for said selected one of said plants a mathematical model responsive to said manual controls for producing at least one simulated operating parameter for display by said indicators; and executing said programming to actuate said replaceable indicators in response to said manual controls as regulated by said mathematical model so that said selected one of said plants is simulated.

34. A method according to claim 33 further employing one of a plurality of console-mountable schematic panels each associated with a corresponding one of said plants and comprising the step of:

mounting at said console that one of said schematic panels corresponding to said selected one of said plants.

* * * * *